(12) United States Patent  
Ishikawa et al.

(10) Patent No.: US 10,691,194 B2
(45) Date of Patent: Jun. 23, 2020

(54) ELECTRONIC APPARATUS AND METHOD OF CONTROLLING POWER SUPPLY

(71) Applicant: SONY CORPORATION, Tokyo (JP)

(72) Inventors: Hirotaka Ishikawa, Kanagawa (JP); Takeshi Iwatsu, Kanagawa (JP); Tsubasa Tsukahara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 105 days.

(21) Appl. No.: 15/958,108

(22) Filed: Apr. 20, 2018

(65) Prior Publication Data

US 2018/0239413 A1 Aug. 23, 2018

Related U.S. Application Data

(63) Continuation of application No. 15/118,597, filed as application No. PCT/JP2014/081727 on Dec. 1, 2014, now Pat. No. 9,977,483.

(30) Foreign Application Priority Data

Feb. 21, 2014 (JP) .................................. 2014-031606

(51) Int. Cl.
G02B 27/14 (2006.01)
G09G 5/00 (2006.01)
(Continued)

(52) U.S. Cl.
CPC ....... *G06F 1/3265* (2013.01); *G02B 27/0093* (2013.01); *G02B 27/017* (2013.01);
(Continued)

(58) Field of Classification Search
CPC .... G02B 2027/0178; G02B 2027/0187; G02B 2027/0192; G02B 27/01; G02B 27/0101;
(Continued)

(56) References Cited

U.S. PATENT DOCUMENTS 5,635,948 A 6/1997 Tonosaki
2012/0206443 A1 8/2012 Kimura et al.
(Continued)

FOREIGN PATENT DOCUMENTS

CN 102867474 A 1/2013
CN 102959972 A 3/2013
(Continued)

OTHER PUBLICATIONS

Office Action for CN Patent Application No. 201480075347.0, dated Nov. 1, 2018, 17 pages of Office Action and 26 pages of English Translation.
(Continued)

*Primary Examiner* — William Choi
(74) *Attorney, Agent, or Firm* — Chip Law Group

(57) ABSTRACT

Provided is an electronic apparatus including a wearable optical device, a state detection unit configured to detect a state relating to the wearable optical device, state determination unit configured to determine that the detected state is at least one of a first state in which the wearable optical device is worn by a user in usable state or a second state in which the wearable optical device is worn or carried by the user in unusable state, and a power supply controller configured to control a power supply state of the electronic apparatus based on a result obtained by the determination.

19 Claims, 16 Drawing Sheets

(51) Int. Cl.
| | |
|---|---|
| *G06F 1/3234* | (2019.01) |
| *H04N 5/74* | (2006.01) |
| *G06F 1/16* | (2006.01) |
| *G06F 1/3206* | (2019.01) |
| *G06F 1/3237* | (2019.01) |
| *G02B 27/00* | (2006.01) |
| *G02B 27/01* | (2006.01) |
| *G06F 1/3218* | (2019.01) |
| *G06T 19/00* | (2011.01) |
| *G09G 5/10* | (2006.01) |

(52) U.S. Cl.
CPC ............ *G06F 1/163* (2013.01); *G06F 1/1694* (2013.01); *G06F 1/325* (2013.01); *G06F 1/3206* (2013.01); *G06F 1/3218* (2013.01); *G06F 1/3237* (2013.01); *H04N 5/74* (2013.01); *G02B 2027/0138* (2013.01); *G02B 2027/0178* (2013.01); *G02B 2027/0183* (2013.01); *G06F 2200/1637* (2013.01); *G06T 19/006* (2013.01); *G09G 5/10* (2013.01); *G09G 2320/0626* (2013.01); *G09G 2330/021* (2013.01); *G09G 2340/0407* (2013.01); *Y02D 10/128* (2018.01); *Y02D 10/153* (2018.01); *Y02D 50/20* (2018.01)

(58) Field of Classification Search
CPC .............. G02B 27/0149; G02B 27/017; G02B 27/0172; G02B 27/0176
USPC ........................................... 359/630; 345/7–9
See application file for complete search history.

(56) References Cited

U.S. PATENT DOCUMENTS

| | | |
|---|---|---|
| 2012/0242570 A1 | 9/2012 | Kobayashi |
| 2013/0100363 A1 | 4/2013 | Kakinuma et al. |

FOREIGN PATENT DOCUMENTS

| | | | | |
|---|---|---|---|---|
| JP | 07-294844 A | 11/1995 | | |
| JP | 2004-096224 A | 3/2004 | | |
| JP | 2004-286833 A | 10/2004 | | |
| JP | 4926302 B1 * | 5/2012 | ........... | G02B 27/017 |
| JP | 2012-169726 A | 9/2012 | | |
| JP | 2013-110662 A | 6/2013 | | |
| KR | 10-2013-0040937 A | 4/2013 | | |
| WO | 2012/001880 A1 | 1/2012 | | |
| WO | 2012/153406 A1 | 11/2012 | | |

OTHER PUBLICATIONS

International Search Report and Written Opinion for PCT Application No. PCT/JP2014/081727, dated Feb. 24, 2015, 10 pages of English Translation and 08 pages of ISRWO.

International Preliminary Report on Patentability for PCT Application No. PCT/JP2014/081727, dated Aug. 3, 2016, 10 pages of English Translation and 06 pages of IPRP.

Non-Final Office Action for U.S. Appl. No. 15/118,597, dated Aug. 11, 2017, 9 pages.

Notice of Allowance for U.S. Appl. No. 15/118,597, dated Jan. 24, 2018, 07 pages.

* cited by examiner

ELECTRONIC APPARATUS AND METHOD OF CONTROLLING POWER SUPPLY

CROSS REFERENCE TO RELATED APPLICATIONS

The present application is a continuation application of U.S. patent application Ser. No. 15/118,597, filed Aug. 16, 2016, which is a National Stage Entry of PCT/JP2014/081727, filed Dec. 1, 2014, and claims the benefit of priority from prior Japanese Patent Application 2014-031606, filed Feb. 21, 2014, the entire content of which is hereby incorporated by reference.

TECHNICAL FIELD

The present disclosure relates to an electronic apparatus and a method of controlling power supply.

BACKGROUND ART

A various types of optical devices allowing a viewer to perceive a virtual image superimposed on an image in real space have been recently developed. An example of such optical devices includes a wearable optical device, and in particular, a device that is worn by the user on the head is known as a head-mounted display (HMD). An exemplary type of the HMD is known in which a half mirror serving as a display surface is provided in front of the viewer's pupils and an image (real image) is formed on the display surface. Another type of the HMD is developed in which guidance of image display light to the viewer's pupils using an optical system allows the viewer to perceive an image (virtual image). As one example, Patent Literature 1 discloses the technique that implements an HMD capable of guiding the image display light in the lateral direction with respect to the viewer's pupils to be incident on the viewer's pupils.

For example, the use of the technique disclosed in Patent Literature 1 or other techniques becomes increasingly reducing in size and weight of the wearable optical device such as HMD. The continuous long-term use without frequent charging or the like is desirable due to the characteristics of wearable devices. Under such circumstances, various techniques for reduction in power consumption of the wearable optical device have been developed. As one example, Patent Literature 2 discloses a technique for reduction in power consumption of an HMD by shutting off the power when a sensor for detecting a movement determines that the HMD is not mounted and then by supplying again the power when any movement is detected.

CITATION LIST

Patent Literature

Patent Literature 1: JP 4776285B
Patent Literature 2: JP 3901061B

SUMMARY OF INVENTION

Technical Problem

Although the technique disclosed in Patent Literature 2 as an example can reduce power consumption of the wearable optical device, this is not necessarily a satisfactory solution. As one example, there may be a state in which a movement is not detected, that is, not only when the user does not wear the HMD but also when the user wears or carries a wearable optical device that is in unusable state. In this case, if operations including the generation of image light can be stopped, the effect of reducing power consumption can be further improved. However, the technique as disclosed in Patent Literature 2 is difficult to detect a difference in attachment states of the wearable optical device as described above.

Therefore, an embodiment of the present disclosure provides a novel and improved electronic apparatus and method of controlling power supply, capable of effectively reducing power consumption of a wearable optical device by determining whether the wearable optical device is usable.

Solution to Problem

According to the present disclosure, there is provided an electronic apparatus including a wearable optical device, a state detection unit configured to detect a state relating to the wearable optical device, a state determination unit configured to determine that the detected state is at least one of a first state in which the wearable optical device is worn by a user in usable state or a second state in which the wearable optical device is worn or carried by the user in unusable state, and a power supply controller configured to control a power supply state of the electronic apparatus based on a result obtained by the determination.

According to the present disclosure, there is provided a method of controlling power supply including detecting a state relating to a wearable optical device, determining that the detected state is at least one of a first state in which the wearable optical device is worn by a user in usable state or a second state in which the wearable optical device is worn or carried by the user in unusable state, and controlling a power supply state of an electronic apparatus including the wearable optical device based on a result obtained by the determination.

It is possible to detect a state in which the wearable optical device is worn by the user in usable state and a state in which it is worn or carried by the user in unusable state on the basis of information indicating a state of the wearable optical device. Thus, not only when the wearable optical device is not worn by the user but also when it is worn or carried but is in unusable state, it is possible to change a state of power supply of the electronic apparatus including the wearable optical device, thereby reducing the power consumption effectively.

Advantageous Effects of Invention

According to the embodiments of the present disclosure, the power consumption of the wearable optical device can be reduced effectively by determining whether the wearable optical device is usable.

Note that the effects described above are not necessarily limited, and along with or instead of the effects, any advantageous effect set forth herein or other effects that can be expected from the present specification may be exhibited.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be given in the following order.
1. First Embodiment
 1-1. System Configuration
 1-2. Control of Power Supply of HMD
2. Second Embodiment
3. Third Embodiment
4. Other Examples
5. Hardware Configuration
6. Supplement 1. First Embodiment (1-1. System Configuration)

Figure 1:
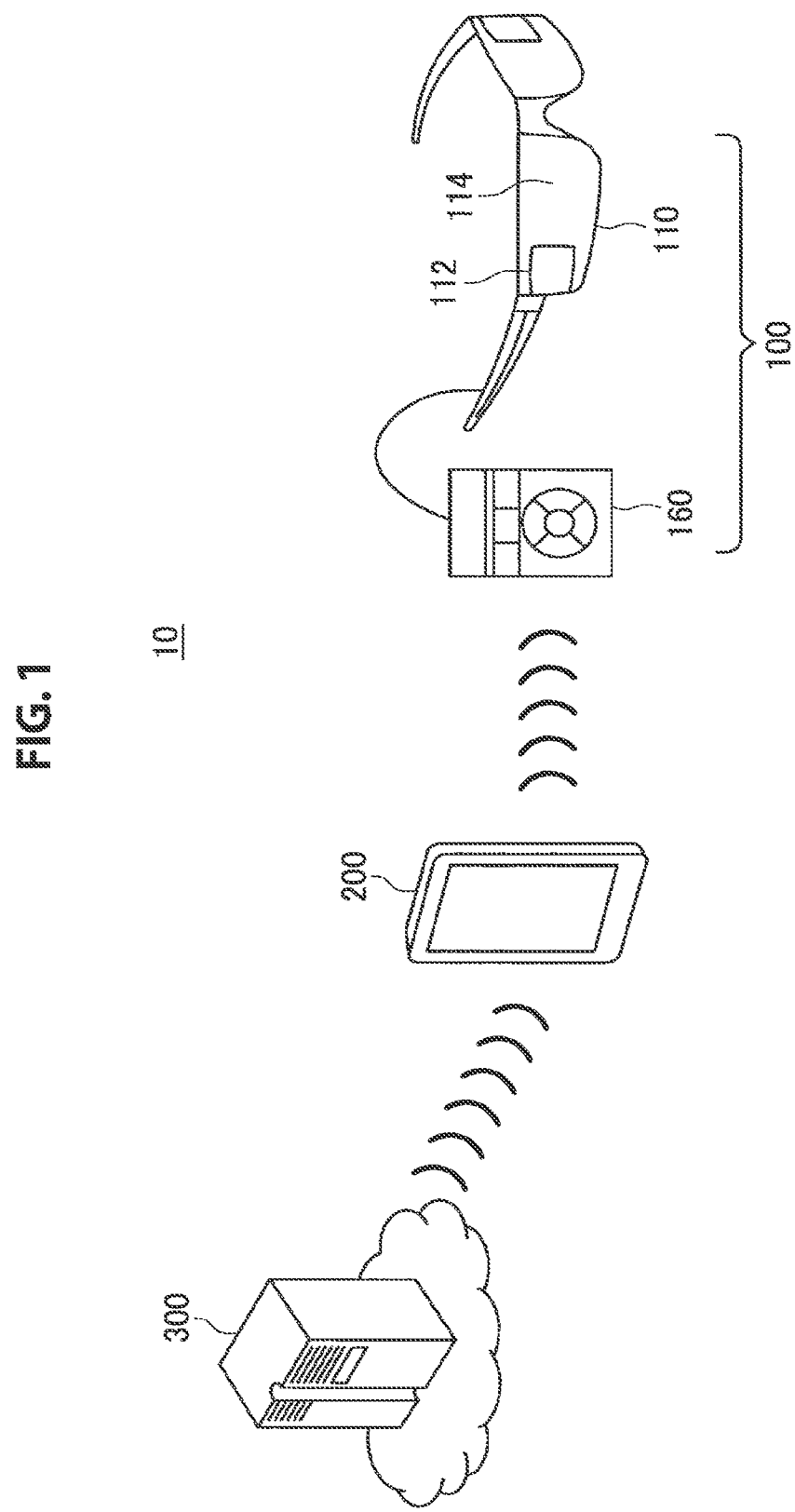
FIG. 1 is a diagram showing a schematic configuration of a system according to a first embodiment of the present disclosure.
Figure 2:
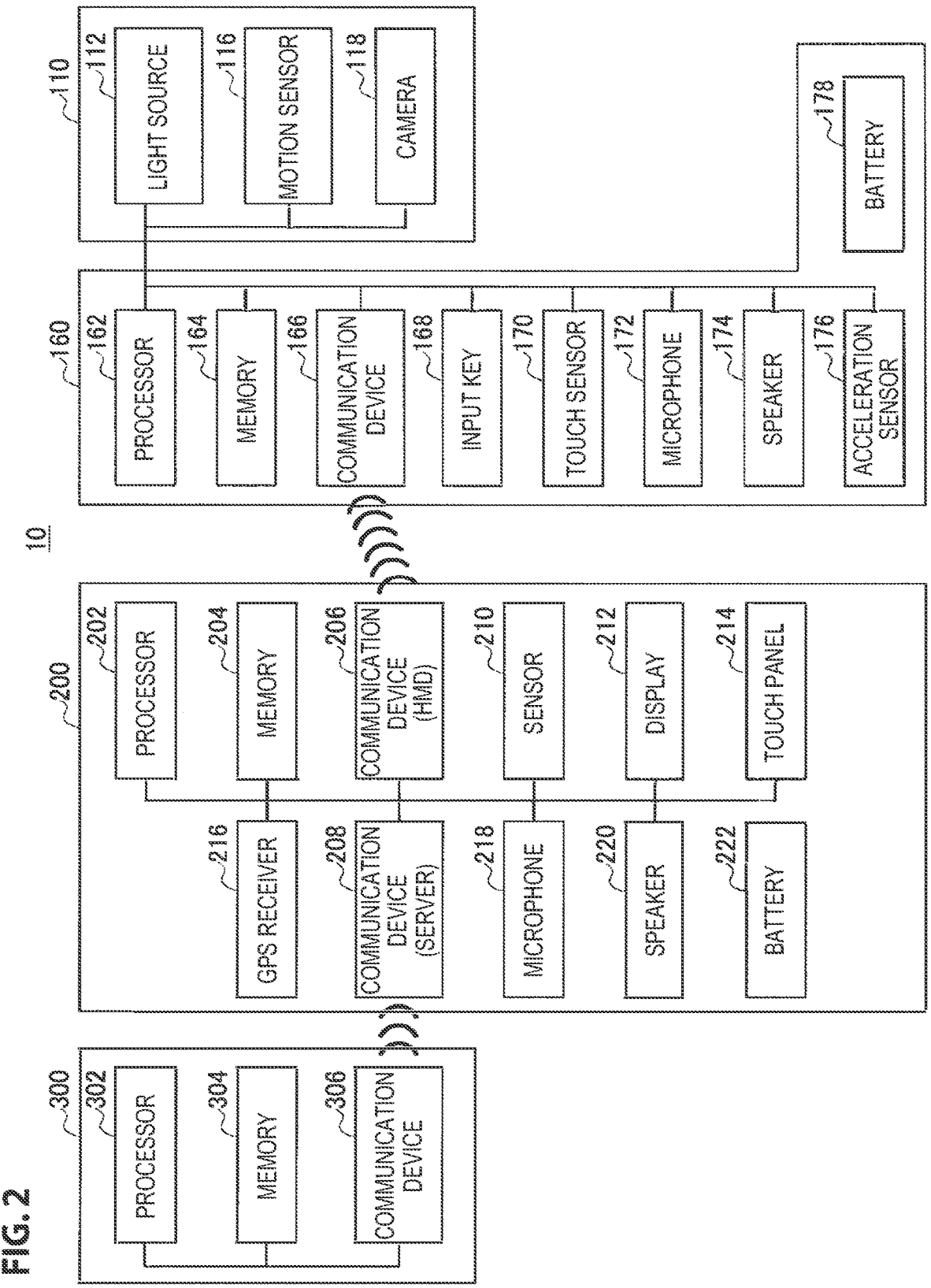
FIG. 2 is a block diagram showing a schematic functional configuration of the system shown in FIG. 1.

FIG. 1 is a diagram showing a schematic configuration of a system according to a first embodiment of the present disclosure. FIG. 2 is a block diagram showing a schematic functional configuration of the system shown in FIG. 1. Referring to FIGS. 1 and 2, the system 10 includes a head-mounted display (HMD) 100, a smartphone 200, and a server 300. Hereinbelow, configurations of the respective devices will be described.

(Head-Mounted Display)

The HMD 100 includes a display unit 110 and a control unit 160. The display unit 110 has a housing in the shape of, for example, glasses, and is worn by a user (observer) on his or her head. The control unit 160 is connected to the display unit 110 by a cable.

The display unit 110 is provided with a light source 112 and a light guide plate 114 as shown in FIG. 1. The light source 112 emits image display light according to control of the control unit 160. The light guide plate 114 guides the image display light incident from the light source 112, and then emits the image display light to a position corresponding to the eyes of the user. The eyes of the user receive incidence of light that is incident on the light guide plate 114 from a real space and is then transmitted through the light guide plate 114, and the image display light guided from the light source 112 by the light guide plate 114. Accordingly, the user wearing the display unit 110 can perceive an image being superimposed on the real space. Note that, for the configuration for causing the image display light to be emitted from the light source 112 through the light guide plate 114, for example, the technology disclosed in JP4776285B described above may be used. The display unit 110 may be further provided with an optical system that is not illustrated for the configuration.

Further, the display unit 110 is provided with a motion sensor 116, and a camera 118 as shown in FIG. 2. The motion sensor 116 includes, for example, a triaxial acceleration sensor, a triaxial gyro sensor, and a triaxial geomagnetic sensor. Based on acceleration, an angular velocity, and a direction of the display unit 110 detected by the sensors, an attitude and a motion (displacement and rotation) of the display unit 110 can be specified. The camera 118 photographs images of the real space. The images photographed by the camera 118 are treated as, for example, images corresponding to the visual field of the user in the real space.

The control unit 160 is provided with a processor 162, a memory 164, a communication device 166, an input key 168, a touch sensor 170, a microphone 172, a speaker 174, an acceleration sensor 176, and a battery 178. The processor 162 operates according to programs stored in the memory 164 to provide various functions. The function of a state determination unit, a power supply controller, or the like, which will be described later, is implemented by the processor 162, as one example. The processor 162 transmits control signals to the display unit 110 in wired communication through a cable, and provides power for the light source 112 and the motion sensor 116. In addition, the processor 162 acquires data output from the motion sensor 116 and the camera 118 provided in the display unit 110, and executes processes based on the data.

The memory 164 stores various kinds of data for operations of the processor 162. For example, the memory 164 stores programs for the processor 162 to realize various functions. In addition, the memory 164 temporarily stores data output from the motion sensor 116 and the camera 118 of the display unit 110. The communication device 166 executes wireless communication with the smartphone 200. For the wireless communication, for example, Bluetooth (a registered trademark), Wi-Fi, or the like is used. The input key 168 includes, for example, a return key, a Push-to-Talk (PTT) key, and the like, and acquires user operations with respect to the HMD 100. The touch sensor 170 likewise acquires user operations with respect to the HMD 100. To be more specific, the touch sensor 170 acquires, for example, operations such as tapping, swiping and the like performed by a user.

The microphone 172 converts sound into an audio signal and provides it to the processor 162. The speaker 174 outputs sound under control of the processor 162. The acceleration sensor 176 is a three-axis acceleration sensor as one example, and detects acceleration of the control unit 160. The battery 178 supplies power to the entire components of the control unit 160 and the display unit 110. The power supply from the battery 178 is controlled depending on the state of power supply that is set by the processor 162, as one example.

Note that a small size and light weight of the display unit 110 are intended in the HMD 100 such that the processor 162, the microphone 172, the speaker 174, the battery 178, and the like can be mounted in the control unit 160, and the display unit 110 and the control unit 160 are separated from each other, but connected with a cable. Since the control unit 160 is also carried by a user, it is desirable that it be as small and light as possible. Thus, by setting the functions realized by the processor 162 as minimum functions for controlling the display unit 110 and other functions to be realized by the smartphone 200, for example, a small size of the entire control unit 160 and battery 178 attributable to a reduction in power consumption of the processor 162 may also be attempted.

(Smartphone)

The smartphone 200 is provided with a processor 202, a memory 204, communication devices 206 and 208, a sensor 210, a display 212, a touch panel 214, a Global Positioning System (GPS) receiver 216, a microphone 218, a speaker 220, and a battery 222. The processor 202 realizes various functions as it operates according to programs stored in the memory 204. As described above, as the processor 202 realizes various functions in cooperation with the processor 162 provided in the control unit 160 of the HMD 100, the control unit 160 can be small and light. The memory 204 stores various kinds of data for operations of the smartphone 200. For example, the memory 204 stores programs for the processor 202 to realize the various functions. In addition, the memory 204 temporarily or permanently stores data acquired by the sensor 210 and the GPS receiver 216 and data transmitted to and received from the HMD 100.

The communication device 206 executes wireless communication using Bluetooth (a registered trademark), Wi-Fi, or the like with the communication device 166 provided in the control unit 160 of the HMD 100. In addition, the communication device 208 executes network communication with the server 300. The network communication may be executed via, for example, a mobile telephone network. The display 212 displays various images according to control of the processor 202. The touch panel 214 is disposed on the display 212, and acquires touch operations of the user with respect to the display 212. The GPS receiver 216 receives GPS signals for measuring latitude, longitude, and altitude of the smartphone 200. The microphone 218 converts sounds into audio signals, and then provides the signals to the processor 202. The speaker 220 outputs sounds according to control of the processor 202. The battery 222 supplies power to the entire smartphone 200.

(Server)

The server 300 is provided with a processor 302, a memory 304, and a communication device 306. Note that the server 300 is realized, for example, through cooperation between a plurality of server devices on a network; however, it will be described as a virtual single device herein for simplification of description. The processor 302 realizes various functions as it operates according to programs stored in the memory 304. The processor 302 of the server 300 executes various information processes according to, for example, requests received from the smartphone 200, and transmits results thereof to the smartphone 200. The memory 304 stores various kinds of data for operations of the server 300. For example, the memory 304 stores programs for the processor 302 to realize the various functions. Further, the memory 304 may temporarily or continuously store data uploaded from the smartphone 200. The communication device 306 executes network communication via, for example, a mobile telephone network with the smartphone 200.

Hereinabove, the system configuration according to the first embodiment of the present disclosure has been described. Note that, in the present embodiment, the HMD 100 is an example of an electronic apparatus, including the wearable optical device (display unit 110). As described above, the HMD 100 makes an observer perceive images by guiding image display light to the eyes of the observer using the light guide plate 114. Thus, although the term "display" is used, the HMD 100 is not necessarily a device that causes images to be formed on its display plane. Of course, an HMD of another known type such as a type of HMD in which images are formed on its display plane may be used instead of the HMD 100.

In addition, the system configuration described above is an example, and various other system configurations are also possible. For example, the HMD 100 may not necessarily have the display unit 110 and the control unit 160 separated from each other, and the entire configuration of the HMD 100 described above may be consolidated in a glasses-type housing such as the display unit 110. In addition, as described above, at least some of the functions for controlling the HMD 100 may be realized by the smartphone 200. Alternatively, the display unit 110 may also be provided with a processor and thus information processing of the HMD 100 may be realized in cooperation between the processor 162 of the control unit 160 and the processor of the display unit 110.

As another modified example, the system 10 may not include the smartphone 200, and communication may be directly executed between the HMD 100, and the server 300. In addition, in the system 10, the smartphone 200 may be replaced by another device that can execute communication with both of the HMD 100 and the server 300, for example, a tablet terminal, a personal computer, a portable game device, or the like.

Figure 3:
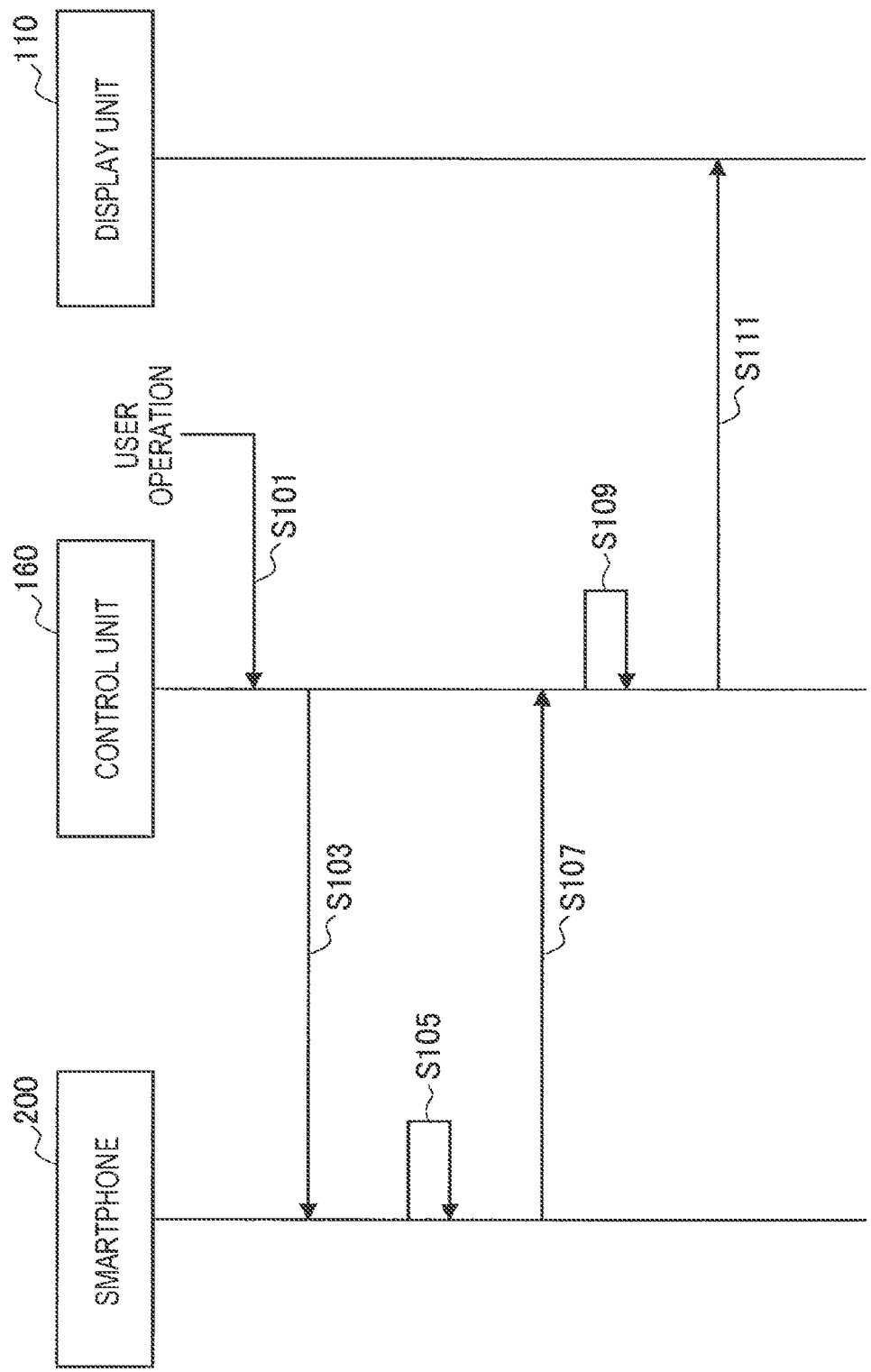
FIG. 3 is a diagram showing an example of the sequence of processes of the system according to the first embodiment of the present disclosure.

FIG. 3 is a diagram showing an example of the sequence of processes of the system according to the first embodiment of the present disclosure. Referring to FIG. 3, first, a user operation is input to the control unit 160 of the HMD 100 via the touch sensor 170 (S101). At that time, the processor 162 transmits information indicating the content of the user operation to the smartphone 200 using the communication device 166 (S103). The processor 202 of the smartphone 200 determines the content of an image to be displayed next based on the information from the HMD 100 received through the communication device 206 (S105). Although not illustrated, the processor 202 may communicate with the server 300 at that time using the communication device 208 to acquire information necessary for the image to be displayed next.

Next, the processor 202 transmits the information necessary for the image to be displayed next, for example, an icon, text, or the like, to the HMD 100 using the communication device 206 (S107). The processor 162 of the HMD 100 generates the image to be displayed next (frame image) based on the information from the smartphone 200 received through the communication device 166 (S109). Further, the processor 162 controls the light source 112 of the display unit 110 based on data of the generated frame image, and thereby updates a frame of an image provided with image display light emitted from the light source 112 (S111).

(1-2. Control of Power Supply of HMD)

Figure 4:
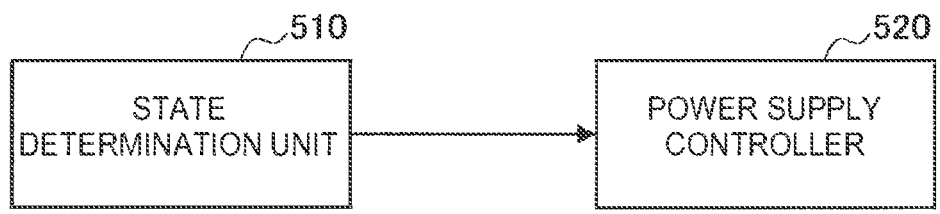
FIG. 4 is a block diagram showing a functional configuration for controlling power supply of an HMD in the first embodiment of the present disclosure.

FIG. 4 is a block diagram showing a functional configuration for controlling power supply of an HMD in the first embodiment of the present disclosure. Referring to FIG. 4, the control of power supply of the HMD is implemented in the present embodiment by the functional configuration that includes a state determination unit 510 and a power supply controller 520.

As described above, in the system 10, these functional components are implemented by allowing the processor 162 included in the control unit 160 of the HMD 100 to be executed in accordance with the program stored in the memory 164. Alternatively, some or all of the functional components may be implemented by allowing the processor 202 of the smartphone 200 communicating with the HMD through wireless communication such as Bluetooth (registered trademark) and Wi-Fi to be executed in accordance with the program stored in the memory 204. Similarly, some or all of the functional components may be implemented by allowing the processor 302 of the server 300 to be executed in accordance with the program stored in the memory 304. In other words, the functional components may be implemented in any electronic apparatus (HMD 100, smartphone 200, or server 300) included in the system 10 or may be implemented by a plurality of electronic apparatuses included in the system 10 in cooperation with each other.

(State Determination)

The determination of a state of the display unit 110 of the HMD 100 performed by the state determination unit 510 will be first described. In the present embodiment, the state determination unit 510 determines that a state of the attitude or movement of the display unit 110 indicated by a detection value obtained by the acceleration sensor included in the motion sensor 116 is at least one of a first state and a second state. The first state is a state in which the display unit 110 is worn by the user in usable state. The second state is a state in which the display unit 110 is worn or carried by the user in unusable state. The display unit 110 is an example of the wearable optical device in the present embodiment.

More specifically, in the present embodiment, the state determination unit 510 uses information indicating acceleration of the display unit 110 as the information indicating the state of attitude or movement of the display unit 110. The information indicating acceleration is acquired by the acceleration sensor included in the motion sensor 116 provided in the display unit 110. Thus, the motion sensor 116 is an example of a state detection unit configured to detect the state of the wearable optical device in the present embodiment. The state determination unit 510 determines the state on the basis of a detection value and/or acceleration variation of the display unit 110, as more specifically described below.

(1) State Determination Using Acceleration Detection Value

When the three-axis acceleration sensor detects acceleration of the display unit 110, the detected acceleration contains a gravitational acceleration component ($g \approx 9.8$ m/s$^2$). The gravitational acceleration component has a fixed direction (vertically downward), and thus the attitude of the display unit 110 can be specified on the basis of the relative direction of the gravitational acceleration component with respect to the detection axes (x-axis, y-axis, and z-axis) of the three-axis acceleration sensor. This will be described in detail with reference to FIGS. 5(a), 5(b) and 5(c).

Figure 5:
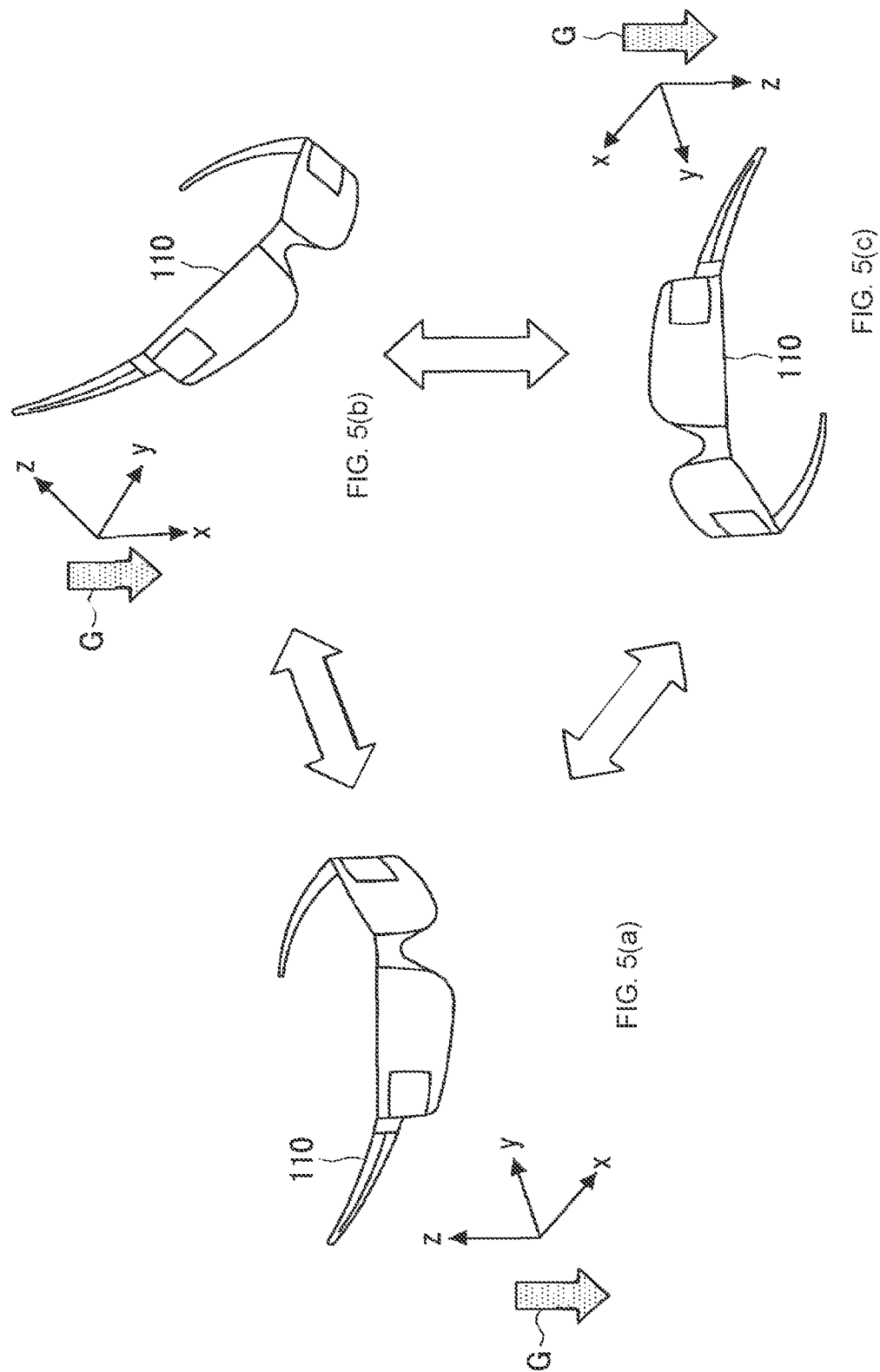
FIGS. 5(a), 5(b) and 5(c) are diagrams showing the relationship between the detection axes of an acceleration sensor and the direction of a gravitational acceleration component in the first embodiment of the present disclosure.

FIGS. 5(a), 5(b) and 5(c) are diagrams showing the relationship between the detection axes (x-axis, y-axis, and z-axis) of the three-axis acceleration sensor included in the display unit 110 and the direction of the gravitational acceleration component G of acceleration. In the shown example, the detection axes of the three-axis acceleration sensor are set on the basis of the attitude of the display unit 110 shown in FIG. 5(a) (the attitude when it is properly mounted on the user's head). The detection axis includes the x-axis in the front and rear direction (direction from rear to front is the positive direction), the y-axis in the right and left direction (direction from right to left is the positive direction), and the z-axis in the up and down direction (direction from down to up is the positive direction), as viewed from the user who wears the display unit 110. In FIG. 5(a), the gravitational acceleration component G of acceleration is detected in the negative direction of the z-axis.

In this description, when the display unit 110 is inclined from the attitude shown in FIG. 5(a) to that shown in FIG. 5(b) as one example, the absolute direction of the gravitational acceleration component G is not changed, but the detection axes of the three-axis acceleration sensor are inclined. Thus, in FIG. 5(b), the gravitational acceleration component G of acceleration is detected in an inclined direction intersecting the respective detection axes. The inclined attitude of the display unit 110 as shown in FIG. 5(b) may happen when the display unit 110 is raised from the front of the user's eyes and is worn on the forehead or when the display unit 110 is hung around the user's neck, as one example.

Furthermore, when the display unit 110 is inverted from the attitude shown in FIG. 5(a) to that shown in FIG. 5(c) as one example, the absolute direction of the gravitational acceleration component G is not changed, but the detection axes of the three-axis acceleration sensor are reversed. In other words, the x-axis, the y-axis, and the z-axis have the same direction as FIG. 5(a), but their orientations are reversed from positive to negative or vice versa. Thus, in FIG. 5(c), the gravitational acceleration component G of acceleration is the positive direction of the z-axis, that is, it is detected in the direction reversed from the case in FIG. 5(a).

Unlike other mobile devices, the display unit 110 is mounted on a particular part (e.g., head) of the user's body, and thus the attitude during use is substantially determined. More specifically, the display unit 110 is typically used with the attitude shown in FIG. 5(a). Thus, in the present embodiment, the state determination unit 510 is capable of determining the state of the display unit 110 on the basis of a change in detection values (vectors) of acceleration as shown in FIGS. 5(a), 5(b) and 5(c).

More specifically, in the example shown in FIGS. 5(a), 5(b) and 5(c), when the direction of the gravitational acceleration component G contained in the acceleration detection value corresponds to a predetermined direction (negative direction of z-axis), the state determination unit 510 is capable of detecting a first state in which the display unit 110 is worn by the user in usable state (the state shown in FIG. 5(a)). When the direction of the gravitational acceleration component G contained in the acceleration detection value differs from the predetermined direction (negative direction of z-axis), the state determination unit 510 is capable of detecting a second state in which the display unit 110 is worn or carried by the user in unusable state (the state shown in FIGS. 5(b) and 5(c)). Examples of the second state may include a state in which the display unit 110 is placed on a table or the like without being worn or carried by the user. Such a state is also treated in a way similar to the state in which the display unit 110 is worn or carried by the user in unusable state from a point of view that it is preferable to be set as a power saving state by power supply control, which will be described later.

Alternatively, in the example shown in FIGS. 5(a), 5(b) and 5(c), when the direction of the gravitational acceleration component G contained in the acceleration detection value is the direction opposite (positive direction of z-axis) to a predetermined direction, the state determination unit 510 may be configured to detect the second state. In this case, unlike the above example, the states shown in FIGS. 5(a) and 5(b) correspond to the first state, and the state shown in FIG. 5(c) corresponds to the second state.

In this description, in the state shown in FIG. 5(a), the display unit 110 mounted on the user's head does not necessarily maintain a horizontal level, but it has some degree of inclination with the head's movement. Thus, the state shown in FIG. 5(a) may be determined to be not only a case where the gravitational acceleration component G corresponds to a predetermined direction (negative direction of z-axis) but also a case where it substantially corresponds to the predetermined direction, that is, a case where a difference between the gravitational acceleration component G and the predetermined direction is within an acceptable range.

Similarly, for example in the state shown in FIG. 5(c), the display unit 110 is estimated to be in the inverted state, but it is not strictly maintained in the inverted attitude because it is not in usable state. Thus, the state shown in FIG. 5(c) may be determined to be not only a case where the gravitational acceleration component G is in the direction opposite (negative direction of z-axis) to a predetermined direction but also a case where the direction is substantially opposite to the predetermined direction, that is, a case where a difference between the gravitational acceleration component G and a state of being opposite to the predetermined direction is within an acceptable range.

As described above, in the example shown in FIGS. 5(a), 5(b) and 5(c), the display unit 110 is typically used in the state shown in FIG. 5(a). However, when the user's head inclines for a moment, the attitude of the display unit 110 will be changed. On the other hand, it seldom occurs that the user keeps his head inclined over a long time. In such a case, as described below, the state determination unit 510 can execute the determination performed by combining the acceleration detection value with time, thereby detecting the state of the display unit 110 in a more appropriate manner.

Figure 6:
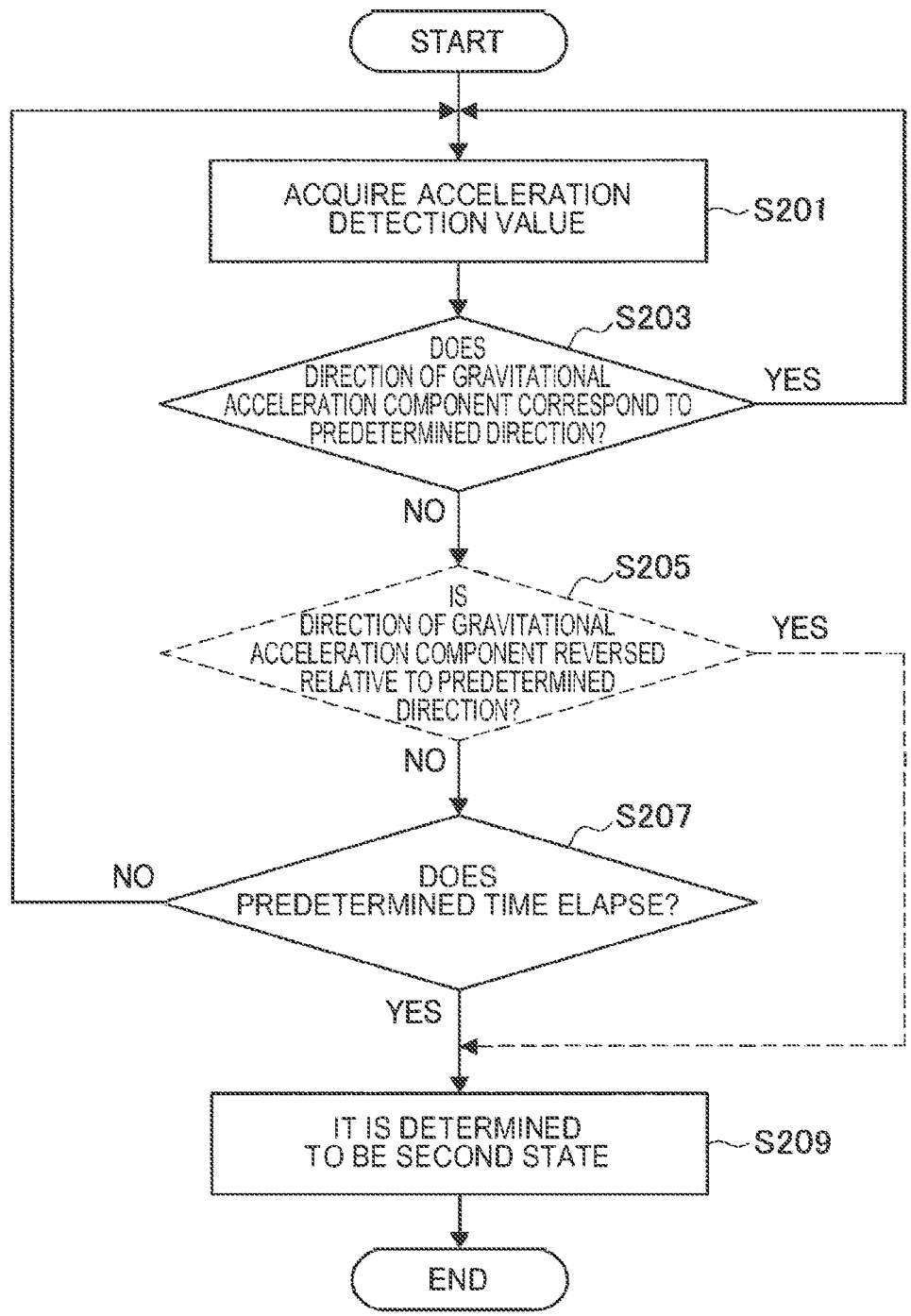
FIG. 6 is a flowchart showing an example of a detection process based on an acceleration detection value in the first embodiment of the present disclosure.

FIG. 6 is a flowchart showing an example of a process in the case where the state determination unit 510 executes the determination performed by combining the acceleration detection value with time. Referring to FIG. 6, the state determination unit 510 acquires an acceleration detection value obtained by detecting acceleration of the display unit 110 (S201). In this connection, the acceleration detection value may be acquired by the three-axis acceleration sensor included in the motion sensor 116. Then, the state determination unit 510 determines whether the direction of a gravitational acceleration component contained in the acceleration detection value corresponds to a predetermined direction (S203). The predetermined direction is the negative direction of the z-axis in the example shown in FIGS. 5(a), 5(b) and 5(c), as one example. As described above, the determination of direction may be performed while permitting a difference within a predetermined acceptable range.

If it is determined in step S203 that the direction of a gravitational acceleration component contained in the acceleration detection value corresponds to the predetermined direction (YES), the process returns to step S201. On the other hand, if it is not determined that the direction of a gravitational acceleration component contained in the acceleration detection value corresponds to the predetermined direction (NO), the state determination unit 510 may determine whether the direction of the gravitational acceleration component is the direction opposite to the predetermined direction (S205). In the case where this determination process is performed, if it is determined that the gravitational acceleration component is in the direction opposite to the predetermined direction (YES), a process of waiting for the lapse of a predetermined time in step S207 is not performed, and the state determination unit 510 determines that the display unit 110 is in the second state in which the display unit 110 is worn or carried by the user in unusable state (S209).

On the other hand, if it is not determined in the determination process of step S205 that the gravitational acceleration component is in the opposite direction to the predetermined direction (NO) or if the determination process of step S205 is not performed, the state determination unit 510 waits for the lapse of a predetermined time in the state in which the direction of a gravitational acceleration component does not correspond to the predetermined direction (S207). If the predetermined time elapses (YES), the state determination unit 510 determines that the display unit 110 is in the second state (S209). On the other hand, if the direction of a gravitational acceleration component corresponds to the predetermined direction before the lapse of the predetermined time, the process returns to step S201.

The process described above makes it possible to determine the state of the display unit 110 and to prevent erroneous detection of the second state in the case where the user's head inclines for a moment, on the basis of the detection value obtained by the acceleration sensor included in the display unit 110. In the determination process of step S205 performed selectively, when the direction of the gravitational acceleration component contained in the acceleration is substantially reversed, that is, when the attitude of the display unit 110 is the attitude shown in FIG. 5(c), the determination that the display unit 110 is in unusable state without necessity of waiting for the lapse of a predetermined time makes it possible to determine the state more quickly. As another example, even when the direction of the gravitational acceleration component contained in the acceleration is substantially reversed, the state determination unit 510 may determine the state after waiting for the lapse of a predetermined time.

(2) State Determination Using Acceleration Variation

The human body's acceleration varies depending on individual body parts of human. The user's head on which the display unit 110 is mounted is not a body part upon which a relatively large value of acceleration is acting like hands and feet. However, the head is undoubtedly one of the body parts, and thus it keeps moving slightly unless the user holds his head still with the intention of the user. Thus, the acceleration of the display unit 110 keeps changing to a greater or lesser extent while the display unit 110 is mounted on the user's head. When the user is walking or running while wearing the display unit 110, the acceleration changes significantly.

The state determination unit 510 is capable of determining the state of the display unit 110 by using the characteristics as described above. As one example, when a state in which the acceleration variation of the display unit 110 is less than a threshold (a first threshold) is continued for a predetermined time, the state determination unit 510 may detect the second state in which the display unit 110 is worn or carried by the user in unusable state. As one example, the first threshold is a value less than the acceleration variation that may occur naturally while the display unit 110 is mounted on the user's head, and may be a value close to zero. Thus, for example, the display unit 110 may be carried by the user while being placed in a bag of the user. In this case, if the amount of movement of the user, the user's bag, or the like is small, then the second state is detected.

Furthermore, the state determination unit 510 may detect the second state on condition that the variation exceeding a second threshold larger than the first threshold is detected prior to the state in which the acceleration variation is less than the first threshold, which is continued for a scheduled time time. As one example, the second threshold is a value corresponding to the acceleration variation that occurs when the display unit 110 is removed from the user's head and then is placed in a bag or the like, that is, a value corresponding to the acceleration variation when an impact is applied to the display unit 110 (as one example, approximately three times the acceleration of gravity). In this case, as one example, when the user intentionally holds his head still while wearing the display unit 110, it is possible to prevent erroneous detection of the second state.

Figure 7:
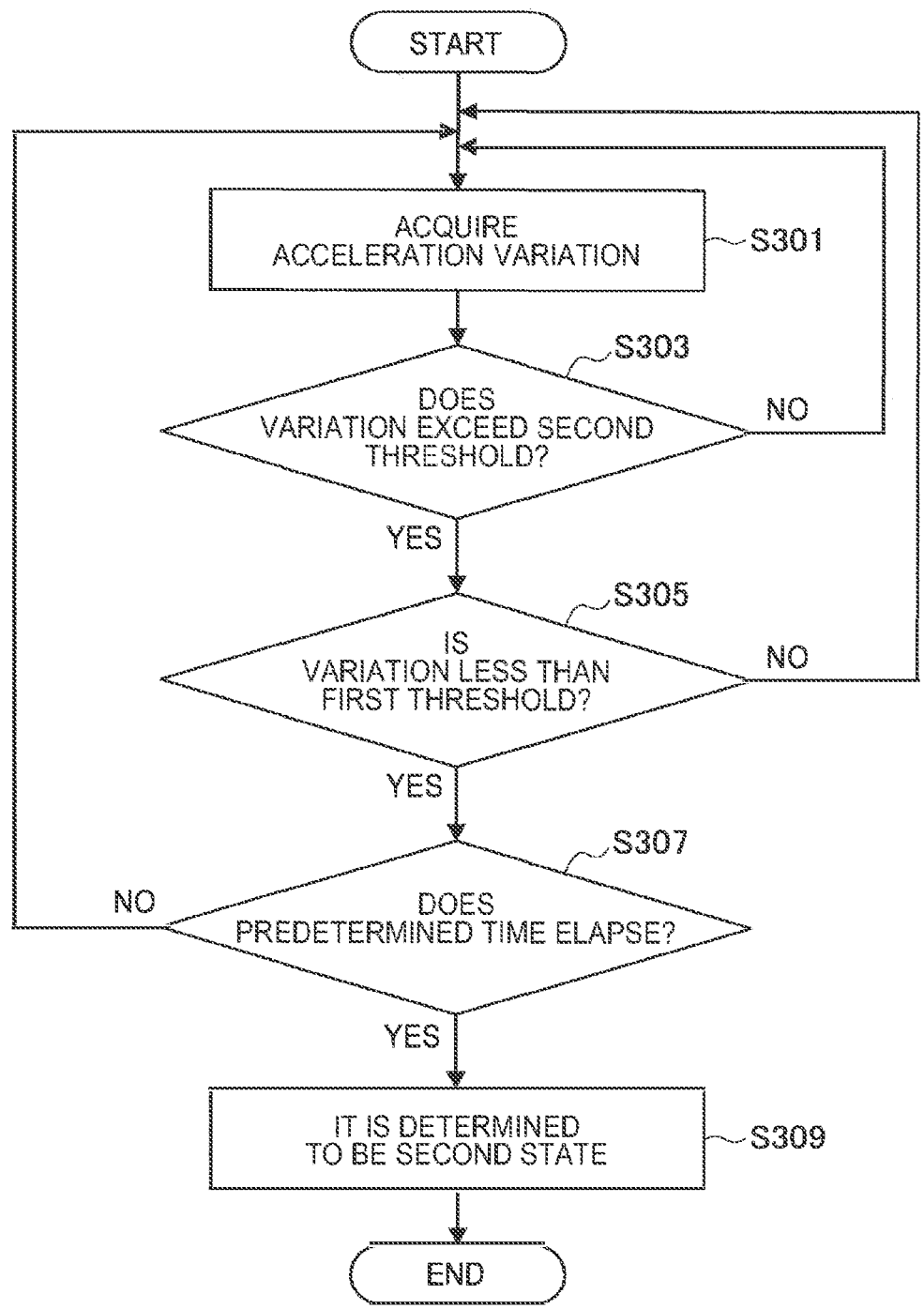
FIG. 7 is a flowchart showing an example of a detection process based on the acceleration variation in the first embodiment of the present disclosure.

FIG. 7 is a flowchart showing an example of a process in the case where the state determination unit 510 performs the determination based on acceleration variation. Referring to FIG. 7, the state determination unit 510 acquires acceleration variation (S301). In this connection, the acceleration variation may be acquired by an acceleration sensor included in the motion sensor 116 provided in the display unit 110. In this example, in determining the state on the basis of the acceleration variation, the direction of acceleration does not matter, and thus the acceleration sensor is not necessarily a three-axis acceleration sensor.

Then, the state determination unit 510 determines whether the acceleration variation exceeds the second threshold (S303). As described above, the second threshold corresponds to the acceleration variation when an impact is applied to the display unit 110. Thus, it may be considered that step S303 determines whether an impact is applied to the display unit 110. If the acceleration variation exceeds the second threshold (YES), the state determination unit 510 determines whether the acceleration variation is less than the first threshold (S305). On the other hand, if the acceleration variation does not exceed the second threshold in step S303 (NO), the state determination unit 510 acquires acceleration variation again.

If it is determined in the determination of step S305 that the acceleration variation is less than the first threshold (YES), the state determination unit 510 waits for the lapse of a predetermined time in the state in which the acceleration variation is less than the first threshold (S307). If the predetermined time elapses (YES), the state determination unit 510 detects the fact that the display unit 110 is in the second state (S309). On the other hand, if the acceleration variation exceeds the first threshold before the predetermined time elapses, the process returns to step S301.

The process described above makes it possible to determine the state depending on the acceleration variation of the display unit 110 and to prevent erroneous detection of the second state in the case where the user intentionally holds his head still.

In the present embodiment, any one of the determination using the acceleration detection value described above and the determination using the acceleration variation may be performed, or a combination of both may be performed. In the combination of both determination processes, if the second state (state in which the display unit 110 is worn or carried by the user in unusable state) is determined using at least one of the acceleration detection value and the acceleration variation, the state determination unit 510 may determine that the display unit 110 is in the second state. As one example, when the display unit 110 is carried in a bag or the like while maintaining its attitude shown in FIG. 5(a), it is difficult to detect the second state on the basis of the acceleration detection value. As one example, when the display unit 110 is hung around the user's neck or is raised and worn on the forehead, a change in acceleration occurs but the display unit 110 may be not mounted in proper attitude. In this case, it is difficult to detect the second state on the basis of the acceleration variation. The determination using the combination state of the acceleration detection value and the acceleration variation makes it possible to detect the state appropriately even in such a case.

(Power Supply State Control)

A power supply control that is performed by the power supply controller 520 will be described. In the present embodiment, the power supply controller 520 control a power supply state of the display unit 110 and a power supply state of the entire HMD 100 including the display unit 110 and the control unit 160, on the basis of a determination result obtained by determination of the state of the display unit 110 by the state determination unit 510.

More specifically, in the present embodiment, when the state determination unit 510 detects the second state, the power supply controller 520 performs a state transition from the power supply state of the display unit 110 or the HMD 100 (the display unit 110 and the control unit 160) to a power saving state. The power saving state refers to a power supply state in which the power consumption is lower than a normal state. As one example, the display unit 110 can be set to the power saving state by stopping emission of image display light from the light source 112, lowering the brightness or resolution of the image display light, stopping some or all of operations of the motion sensor 116, extending an interval of the image capturing performed by the camera 18, or stopping the image capturing. In addition, the control unit 160 can be set to the power saving state by changing the operation mode of the processor 162, the communication device 166, the touch sensor 170, the acceleration sensor 176, or the like, or causing these components to shut down. An example of the power saving state includes a state in which the HMD 100 is powered off.

An example of the power saving state to be set by the power supply controller 520 may include a plurality of power saving states in which their individual power consumption is different. As one example, the power supply controller 520 sets a first power saving state. In the first power saving state, in the display unit 110, the emission of image display light by the light source 112 is stopped, a gyro sensor other than the acceleration sensor included in the motion sensor 116 is deactivated, and the image capturing by the camera 118 is stopped. In addition, in the first power saving state, the power supply controller 520 may be capable of returning the state of the display unit 110 (or HMD 100) from the power saving state to the normal power supply state upon the detection of the first state (state in which the display unit 110 is worn by the user in usable state) on the basis of the acceleration detection value or the acceleration variation of the acceleration sensor included in the motion sensor 116, without deactivating the processor 162 of the control unit 160.

As one example, the power supply controller 520 sets a second power saving state. In the second power saving state, in the display unit 110, substantially all of the components including the acceleration sensor are deactivated. Furthermore, in the second power saving state, in the control unit 160, the operation (clock) of the processor 162 is stopped, and the touch sensor 170 and the acceleration sensor 176 are deactivated. On the other hand, in this case, the communication device 166 is set to a predetermined standby mode, which will be described later.

Figure 8:
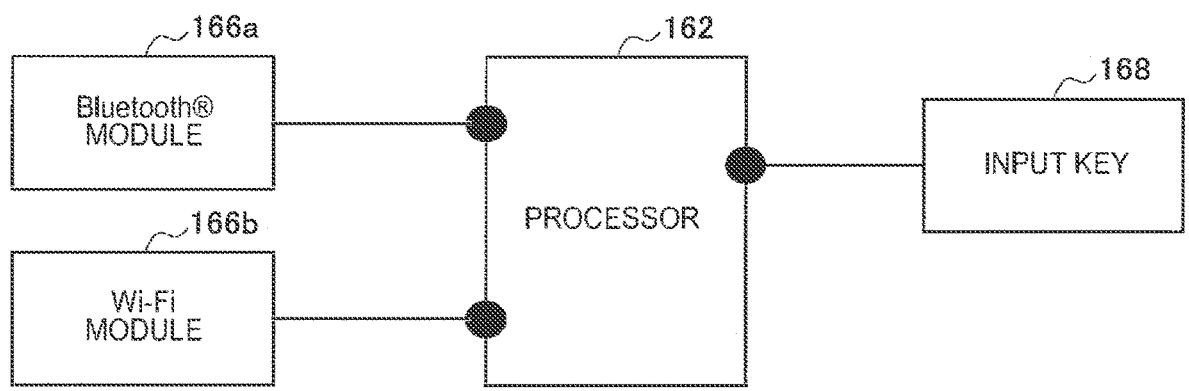
FIG. 8 is a diagram illustrated to describe a method of returning from a power saving state of a processor in the first embodiment of the present disclosure.

FIG. 8 illustrates an example of a method of returning the state of the processor 162 in which the clock is stopped in the second power saving state. In the example shown in FIG. 8, a Bluetooth (registered trademark) module (BT module) 166a and a Wi-Fi module 166b are provided as the communication device 166. In the case where the clock of the processor 162 is stopped in the second power saving state, the processor 162 resumes its operation by regarding, as an interrupt factor, the reception of a key input signal from the input key 168, the reception of a signal by the BT module 166a from other devices including the smartphone 200, and the reception of a signal by the Wi-Fi module 166b from other devices including the smartphone 200. In the BT module 166a, as one example, the sniff mode is set as the standby mode. In addition, in the Wi-Fi module 166b, as one example, the wake-on-wireless (WOW) mode is set as the standby mode. In the case where such a mode is set, the processor 162, when receiving a signal from the smartphone 200 or the like, is capable of resuming its operation relatively quickly. When the processor 162 resumes its operation due to the interrupt factors described above, the power supply controller 520 causes the HMD 100 to undergo a transition to its normal power supply state.

The power supply controller 520 may use the first power saving state and the second power saving state, for example, depending on the duration of the second state (the state in which the display unit 110 is worn or carried by the user in unusable state) that is detected by the state determination unit 510. More specifically, the state determination unit 510 may cause the power supply state of the HMD 100 to undergo a stepwise transition from the first power saving state to the second power saving state (power saving state having lower power consumption) depending on the duration of the second state.

As one example, when the state determination unit 510 detects the second state, the power supply controller 520 causes the power supply state of the HMD 100 to undergo a transition from its normal state to the first power saving state. In the first power saving state, the state determination unit 510 is still capable of determining the state of the display unit 110. Thus, in the first power saving state, when the state determination unit 510 no longer detects the second state or detects the first state (the state in which the display unit 110 is worn by the user in usable state), the power supply controller 520 is capable of causing the power state to return from the power saving state to the normal state.

Furthermore, when the second state continues for a predetermined time or more, the power supply controller 520 causes the power supply state of the HMD 100 to undergo a transition from the first power saving state to the second power saving state. In the second power saving state, the state determination unit 510 no longer detects the state, and thus the power supply state does not return from the power saving state, for example even if the acceleration of the display unit 110 satisfies the determination condition of the first state. However, in the second power saving state, in addition to the state in which the processor 162 can be activated when a key input signal is received through the input key 168, the state in which the communication device 166 can resume its operation relatively quickly when a signal from the smartphone 200 or the like is received remains. Thus, even in the second power saving state, the power supply state of the HMD 100 is allowed to return from the power saving state in a time that is shorter than the state in which the HMD 100 is powered off.

As described above, in the present embodiment, the power supply state of the display unit 100 or the power supply state of the HMD 100 including the display unit 110 is controlled on the basis of the determination result obtained by determining the state of the attitude or movement of the display unit 110, which is indicated by the detection value obtained by the acceleration sensor included in the motion sensor 116. The control of the power supply state specifically includes the transition to the power saving state. Thus, the control of the power supply state based on the state of the display unit 110 makes it possible to reduce power consumption without compromising the user's convenience by causing the function of the display unit 110 or the HMD 100 to be stopped while the user does not wear the display unit 110 in usable state.

In the present embodiment, the state of the display unit 110 is determined on the basis of the acceleration detection value or the acceleration variation. Thus, for example, as the first power saving state described above, it is possible to detect continuously whether it is mounted even in the state in which some functions of the HMD 100 are stopped. The power consumption of the acceleration sensor included in the motion sensor 116 of the display unit 110 is typically lower than that of the light source 112, the gyro sensor included in the motion sensor 116, or the like. Thus, when the light source 112, the gyro sensor, or the like is caused to be stopped, the effect of the reduction of power consumption can be obtained even if the acceleration sensor maintains its operation.

2. Second Embodiment

A second embodiment of the present disclosure will be described. In the second embodiment, the state of the display unit 110 is determined using a method that is different from the first embodiment in a system 10 similar to the first embodiment. Thus, for the configuration of the system that is common to the first embodiment, repeated description will be omitted, and in particular, a process for the state determination will be described.

Figure 9:
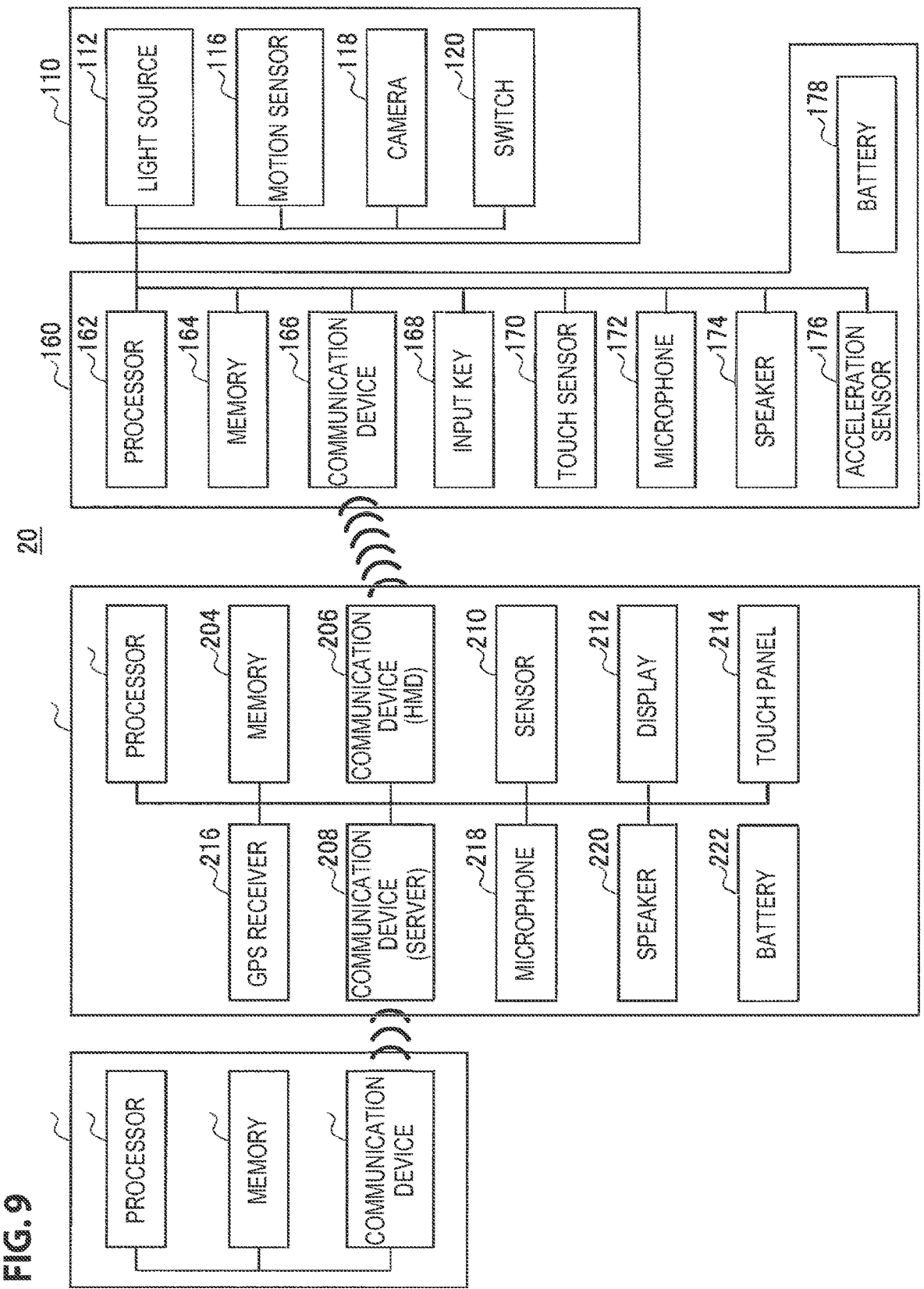
FIG. 9 is a schematic block diagram showing a functional configuration of a system according to a second embodiment of the present disclosure.

FIG. 9 is a schematic block diagram showing a functional configuration of the system according to the second embodiment of the present disclosure. Referring to FIG. 9, in a system 20 according to the present embodiment, a display unit 110 of an HMD 100 is provided with a switch 120 that is configured to detect the state of a connection part of an attachment member, in addition to functional components similar to the system 10 described above. This switch 120 will be described below with reference to FIG. 10.

Figure 10:
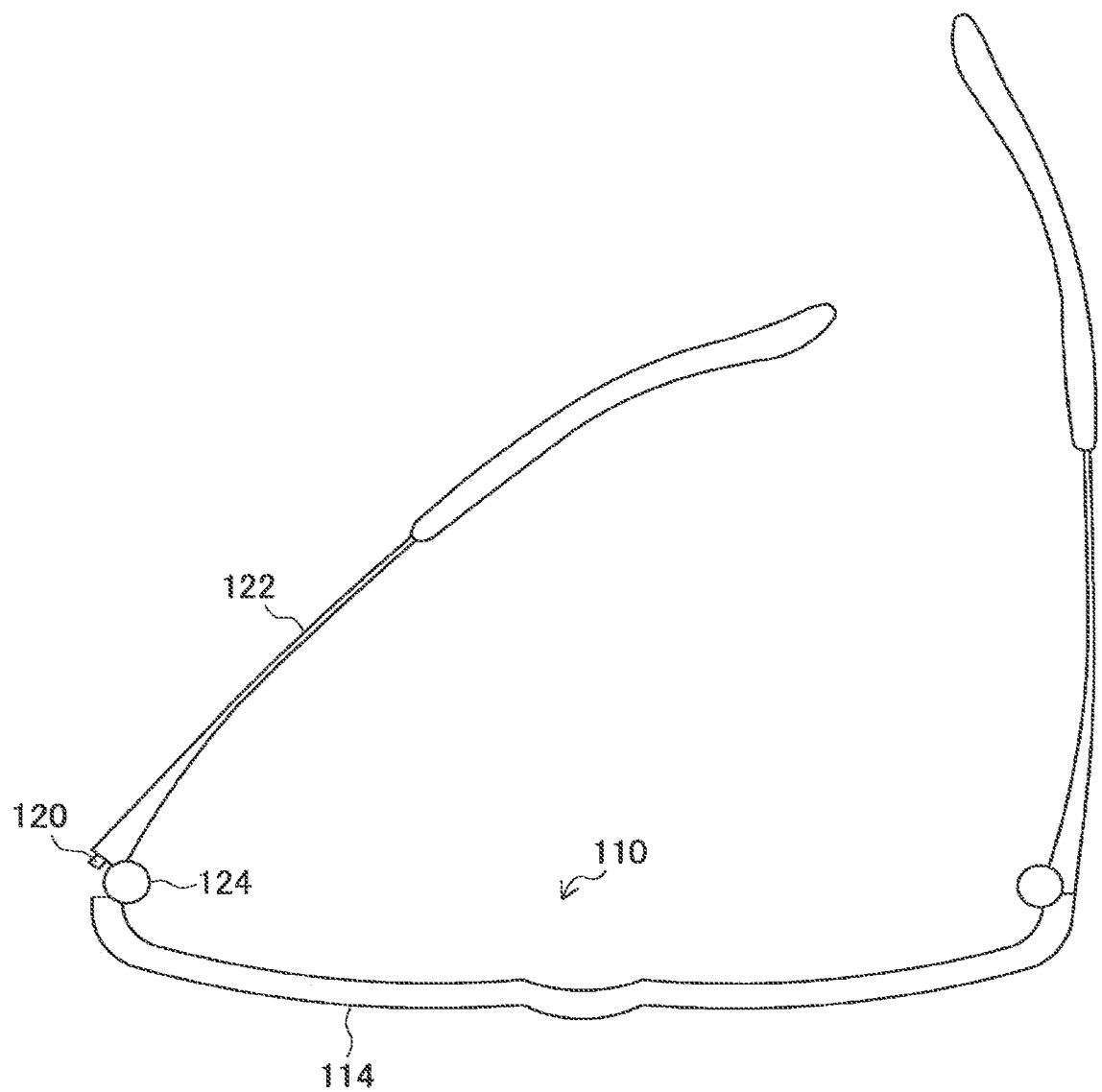
FIG. 10 is a diagram showing an example of a switch used to detect the state of an attachment member in the second embodiment of the present disclosure.

FIG. 10 is a diagram showing an example of the switch used to detect the state of the attachment member in the present embodiment. In the example shown in FIG. 10, the display unit 110 is configured to include a temple 122 and a hinge 124. The hinge 124 is provided between a portion including the light guide plate 114 and the temple 122. The display unit 110 is an example of the wearable optical device in the present embodiment, the temple 122 is an example of the attachment member used to attach the wearable optical device to the user's head, and the hinge 124 is an example of the connection part of the attachment member. The temple 122 and the hinge 124 are well known as components of eyeglasses, and thus a detailed description will be omitted.

In the illustrated example, the rotation about the axis of the hinge 124 allows the temple 122 to be folded. In this connection, the switch 120 is provided at a portion of the hinge 124, and outputs a signal when the temple 122 is folded (deformed) by the rotation of the hinge 124 as shown in the example of FIG. 10.

Figure 11:
FIG. 11 is a block diagram showing a functional configuration used for controlling power supply of an HMD in the second embodiment of the present disclosure.

FIG. 11 is a block diagram showing a functional configuration used for controlling power supply of the HMD in the second embodiment of the present disclosure. Referring to FIG. 11, in the present embodiment, the power supply control of the HMD is implemented by the functional components including a state determination unit 610 and the power supply controller 520. These functional components are implemented, for example, by any of the processor 162 included in the control unit 160 of the HMD 100, the processor 202 of the smartphone 200, and the processor 302 of the server 300, or implemented in cooperation between them, which is similar to the first embodiment.

Also in the present embodiment, the state determination unit 610 determines that the state of the display unit 110 is at least one of the first state of being worn by the user in usable state and the second state of being worn or carried by the user in unusable state. More specifically, in the present embodiment, the switch 120 is an example of a state detection unit configured to detect the state of the attachment member of the display unit 110.

As described above, in the present embodiment, the attachment member is the temple 122. The switch 120 provided in the hinge 124 (connection part) acquires information indicating the state of the temple 122. The state determination unit 610, when acquiring a signal output from the switch 120 in the case where the temple 122 is folded by the rotation of the hinge 124, determines that the display unit 110 is in the second state (the state in which the display unit 110 is worn or carried by the user in unusable state). Alternatively, the state determination unit 610, when acquiring a signal output from the switch 120 in the case where the temple 122 is extended by the rotation of the hinge 124, may determine that the display unit 110 is in the first state (the state in which the display unit 110 is worn by the user in usable state).

The power supply control performed by the power supply controller 520 is performed in a way similar to the first embodiment, and thus a detailed description will be omitted. When the state determination unit 610 detects the second state on the basis of the signal output from the switch 120 in the case where the temple 122 of the display unit 110 is folded, the power supply controller 520 allows the power supply state of the display unit 110 or the HMD 100 to undergo a transition to the power saving state. In this connection, as one example, the power supply controller 520 defines the first power saving state in which the state determination unit 610 is capable of determining the state based on the signal from the switch 120 and the second power saving state in which the determination of the state is not performed instead of further reducing the power consumption. After the power supply state undergoes a transition to the first power saving state, when the second state (the state indicating that the temple 122 is folded by the signal from the switch) continues for a predetermined time or more, the power supply controller 520 may cause the power supply state to undergo a transition to the second power saving state.

(Modification)

Figure 12A:
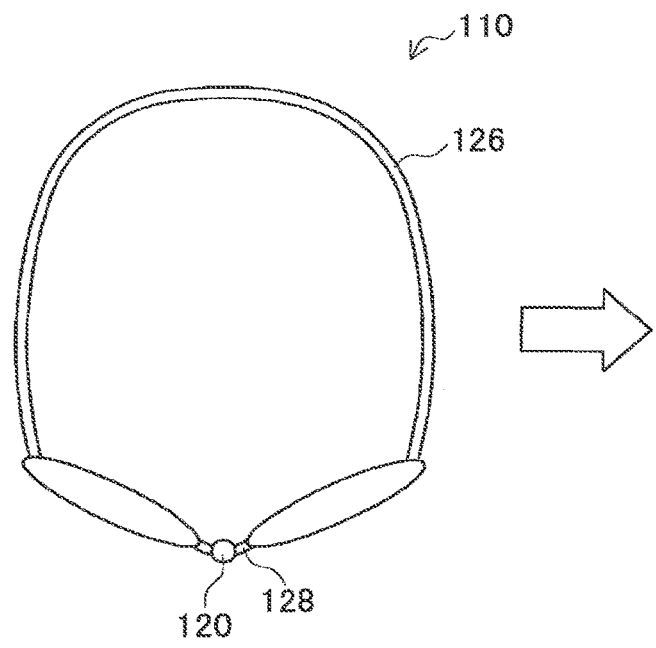
FIGS. 12(a) and 12(b) are diagrams showing an example of a switch used to detect a state of an attachment member in a modification of the second embodiment of the present disclosure.
Figure 12B:
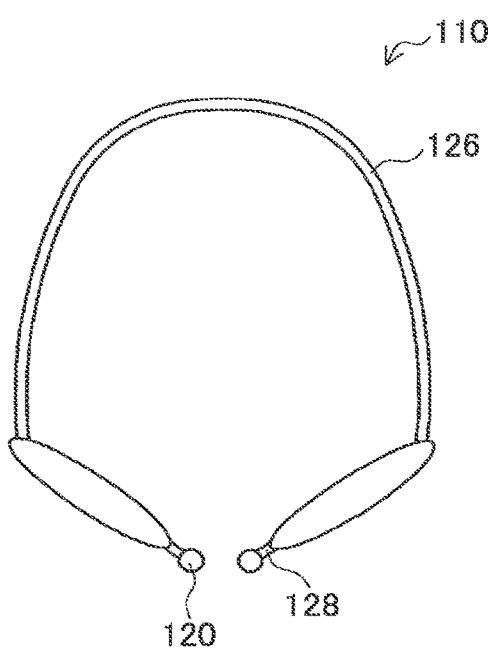

FIGS. 12(*a*) and 12(*b*) are diagrams showing an example of the switch configured to detect the state of the attachment member in the modification of the present embodiment. In the example shown in FIGS. 12(*a*) and 12(*b*), the display unit 110 is configured to include a belt 126 and a buckle 128. The belt 126 is wounded around the user's head to secure the display unit 110 to the head. Thus, the belt 126 is an example of the attachment member of the wearable optical device in the present modification, and the buckle 128 is an example of the connection part of the attachment member. The belt 126 is flexible and elastic, as one example. Thus, when the buckle 128 is fastened, a ring having the inner diameter that is suitable for securing the display unit 110 to the user's head with the belt 126 and the portion included in the light guide plate 114 is maintained, while when the buckle 128 is unfastened, the belt 126 is deformed and the ring is opened, thereby facilitating detachment of the display unit 110.

In the present modification, the switch 120 is provided at a portion of the buckle 128 and outputs a signal when the buckle 128 is unfastened as shown in FIGS. 12(*a*) and 12(*b*). The state determination unit 610, when acquiring this signal, determines that the display unit 110 is in the second state (the state in which the display unit 110 is worn or carried by the user in unusable state). Alternatively, when the buckle 128 is fastened, the switch outputs a signal. The state determination unit 610, when acquiring this signal, may determine that the display unit 110 is in the first state (the state in which the display unit 110 is worn by the user in usable state).

As described above, in the present embodiment, the state of the display unit 110 is determined on the basis of the information indicating the state of the attachment member of the display unit 110 (a physical state of the wearable optical device). The power supply state of the display unit 110 or the HMD 100 including the display unit 110 is controlled on the basis of a determination result obtained by the determination. The control of the power supply state based on the state of the display unit 110 makes it possible to reduce power consumption without compromising the user's convenience by causing the function of the HMD 100 to be stopped while the user does not wear the display unit 110 in usable state.

Although the example in which the attachment member has the connection part and the state detection unit detects the state of the connection part has been described in the present embodiment, the attachment member may not necessarily include the connection part in another embodiment. As one example, the wearable optical device may be mounted on the user's head by inserting a body part on the user's head or face into the attachment member that is elastically deformable. In this case, the state detection unit may be configured to include a strain gauge used to detect the state in which the attachment member is elastically deformed and to determine that the state in which the attachment member is elastically deformed is the second state. When the attachment member includes the connection part, examples of the state detection unit used to detect the state of the connection part include, but not limited to a mechanical switch, an electrical switch provided with a conductive pattern and a contact and an optical switch provided with a reflective photodetector.

The state determination using the state of the attachment member in the present embodiment may be combined with the state determination based on the acceleration detection value and/or acceleration variation in the first embodiment. When the temple 122 is folded or the buckle 128 is unfastened irrespective of the attitude or movement of the display unit 110, the display unit 110 is more likely to be in the unusable state. On the other hand, when the temple 122 is extended or the buckle 128 is fastened, the display unit 110 may be housed or may be hung around the user's neck. The combination between the state determination using the state of the attachment member and the state determination based on the acceleration detection value or acceleration variation makes it possible to detect the state of the display unit 110 properly even in the above case.

3. Third Embodiment

A third embodiment of the present disclosure will be described. In the third embodiment, the state of the display unit 110 is determined using a method that is different from the first embodiment in a system 10 similar to the first embodiment. Thus, for the configuration of the system that is common to the first embodiment, repeated description will be omitted, and in particular, a process for the state determination will be described.

Figure 13:
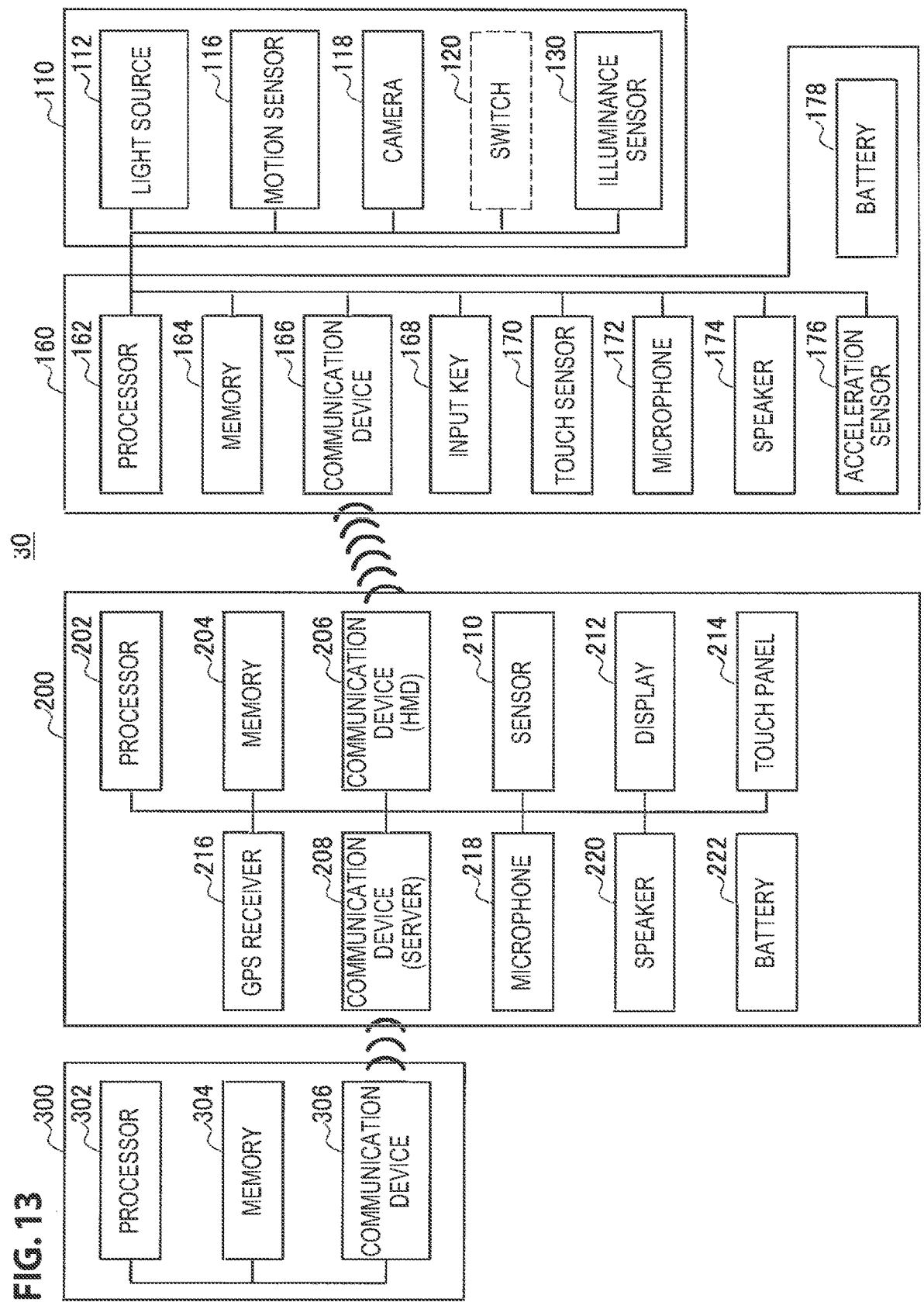
FIG. 13 is a schematic block diagram showing a functional configuration of a system according to a third embodiment of the present disclosure.

FIG. 13 is a schematic block diagram showing a functional configuration of the system according to the third embodiment of the present disclosure. Referring to FIG. 13, in a system 30 according to the present embodiment, a display unit 110 of an HMD 100 is provided with an illuminance sensor 130, in addition to functional components similar to the system 10 (or system 20) described above. The illuminance sensor 130 is an example of a state detection unit used to detect an environmental condition surrounding the wearable optical device and detects the illuminance surrounding the display unit 110.

Figure 14:
FIG. 14 is a block diagram showing a functional configuration used for controlling power supply of the HMD in the third embodiment of the present disclosure

FIG. 14 is a block diagram showing a functional configuration used for controlling power supply of the HMD in the third embodiment of the present disclosure. Referring to FIG. 14, in the present embodiment, the power supply control of the HMD is implemented by functional components including a state determination unit 710 and the power supply controller 520. These functional components are implemented, for example, by any of the processor 162 included in the control unit 160 of the HMD 100, the processor 202 of the smartphone 200, and the processor 302 of the server 300, or implemented in cooperation between them, which is similar to the first embodiment.

Also in the present embodiment, the state determination unit 710 determines that the state of the display unit 110, which is detected by the state detection unit, is at least one of the first state of being worn by the user in usable state and the second state of being worn or carried by the user in unusable state. More specifically, in the present embodiment, the state determination unit 710 detects the second state (the state in which the display unit 110 is worn or carried by the user in unusable state) when a predetermined time elapses in a state in which the illuminance detected by the illuminance sensor 130 included in the display unit 110 is less than a threshold. Alternatively, the state determination unit 710 may detect the first state (the state in which the display unit 110 is worn by the user in usable state) when a predetermined time elapses in a state in which the illuminance detected by the illuminance sensor 130 included in the display unit 110 exceeds a threshold.

The power supply control performed by the power supply controller 520 is performed in a way similar to the first embodiment, and thus a detailed description will be omitted. As one example, when a predetermined time elapses in a state in which the illuminance detected by the illuminance sensor 130 included in the display unit 110 is less than a threshold, the power supply controller 520 causes the power supply state of the display unit 110 or the HMD 100 to undergo a transition to the power saving state. In this connection, as one example, the power supply controller 520 defines the first power saving state in which the state determination unit 710 is capable of determining the state based on the detection value obtained by the illuminance sensor 130 and the second power saving state in which the determination of the state is not performed instead of further reducing the power consumption. After the power supply state undergoes a transition to the first power saving state, when the second state (the state in which the detection value obtained by the illuminance sensor 130 is less than a threshold) continues for a predetermined time or more, the power supply controller 520 may cause the power supply state to undergo a transition to the second power saving state.

As one example, when the display unit 110 is housed in a casing, if the casing is closed, the illuminance surrounding the display unit 110 becomes substantially zero. When the display unit 110 is housed in a casing, the display unit 110 is carried by the user in unusable state. Thus, the state determination unit 710 is capable of determining that the display unit 110 is in the second state on condition that a predetermined time elapses in a state in which the illuminance detected by the illuminance sensor 130 is less than a threshold that is close to zero. The casing is not limited to one in which the entire HMD 100 is completely housed, but the casing may be a cover or the like in which only the display unit 110 is housed.

As described above, in the present embodiment, the power supply state of the display unit 110 or the HMD 100 including the display unit 110 is controlled on the basis of the illuminance surrounding the display unit 110 (an environmental condition surrounding the wearable optical device), which is detected by the illuminance sensor 130 (the state detection unit). The control of the power supply state based on the state of the display unit 110 makes it possible to reduce power consumption without compromising the user's convenience by causing the function of the HMD 100 to be stopped while the user does not wear the display unit 110 in usable state.

The state determination using the detection value obtained by the illuminance sensor 130 in the present embodiment, the state determination based on the acceleration detection value or acceleration variation in the first embodiment, and/or the state determination using the signal from the switch 120 in the second embodiment may be combined with each other. The respective state determination processes are performed in individual different conditions, and thus it is possible to improve the accuracy of the state determination by such combination.

Figure 15:
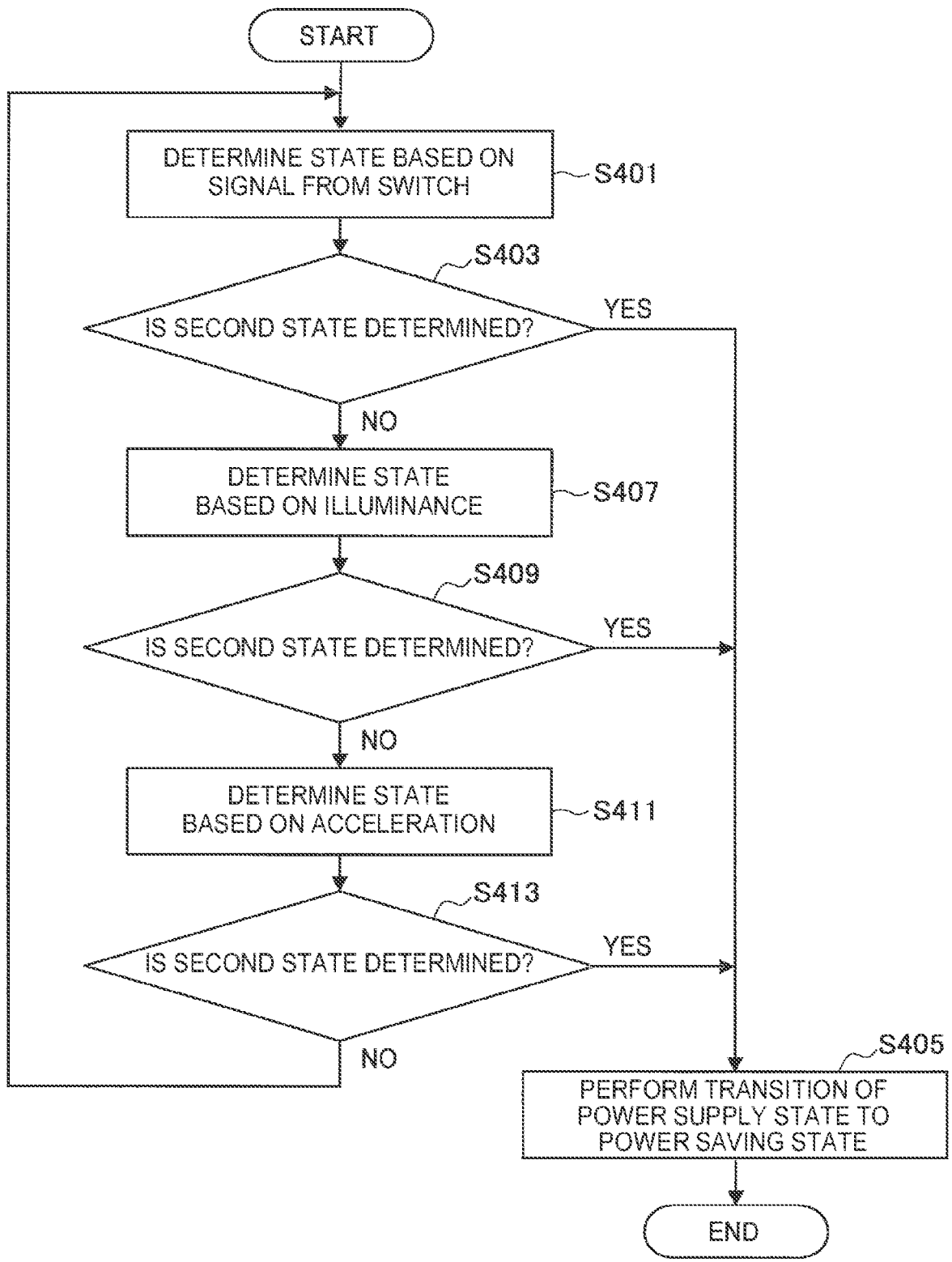
FIG. 15 is a flowchart showing an example of a process performed by combining the attachment state detection in the first, second, and third embodiments of the present disclosure.

FIG. 15 is a flowchart showing an example of a process performed by combining the attachment state detection in the first, second, and third embodiments. Referring to FIG.

15, the state determination unit 710 determines the state of the display unit 110 on the basis of the signal from the switch 120 used to detect the state of the attachment member of the display unit 110 (S401). If it is determined that the display unit 110 is in the second state (YES in S403), the power supply controller 520 causes the power supply state of the display unit 110 or the HMD 100 to undergo a transition to the power saving state (S405).

On the other hand, if it is not determined in step S403 to be in the second state, the state determination unit 710 determines the state of the display unit 110 on the basis of the detection value obtained by the illuminance sensor 130 used to detect the illuminance surrounding the display unit 110 (S407). If it is determined to be in the second state (YES in step S409), the power supply controller 520 causes the power supply state of the display unit 110 or the HMD 100 to undergo a transition to the power saving state (S405).

If it is not determined in step S409 to be in the second state, the state determination unit 710 determines the state of the display unit 110 on the basis of the detection value or variation obtained by the acceleration sensor that detects the acceleration of the display unit 110 (S411). If it is determined that the display unit 110 is in the second state (YES in S413), the power supply controller 520 causes the power supply state of the display unit 110 or the HMD 100 to undergo a transition to the power saving state (S405). In the determination processes described above, if it is determined to be in the second state, the power supply controller 520 does not change the power supply state and the process returns to step S401.

When the state determination processes described in the first to third embodiments are combined as in the above example, the determination using the detection value obtained by the switch 120 or the illuminance sensor 130 has certainty higher than other state determination processes (if the condition is satisfied, the display unit 110 is more likely to be in unusable state), and thus the detection process for this state determination is first performed. Then, if it is determined that the display unit 110 is in the second state, the power supply state may undergo a transition to the power saving state without performing the determination based on the acceleration.

4. Other Examples

As another example, in an embodiment of the present disclosure, examples of the state detection unit used to detect the state of the wearable optical device are not limited to the examples described above, but it may be implemented using various sensors, switches, or the like. Some of the other examples will be described by taking a system 10 similar to the first embodiment as an example.

As one example, the state detection unit may detect the state of the user of the wearable optical device. For the system 10, a line-of-sight sensor included in the display unit 110 of the HMD 100 functions as the state detection unit. The line-of-sight sensor detects the line of sight of the user who wears the display unit 110. In this case, the state determination unit determines the state in which the line-of-sight sensor does not detect the line of sight of the user is the second state in which the display unit 110 is worn or carried by the user in unusable state.

The state detection unit, when detecting the state of the user, may detect an index indicating a fact that the display unit 110 is in contact with or in proximity to the user's body such as body temperature and pulse, but not limited to the line of sight. As with the line of sight, even when the body temperature and pulse are detected, a state in which these targets are not detected is determined to be the second state in which the display unit 110 is worn or carried by the user in unusable state.

5. Hardware Configuration

Figure 16:
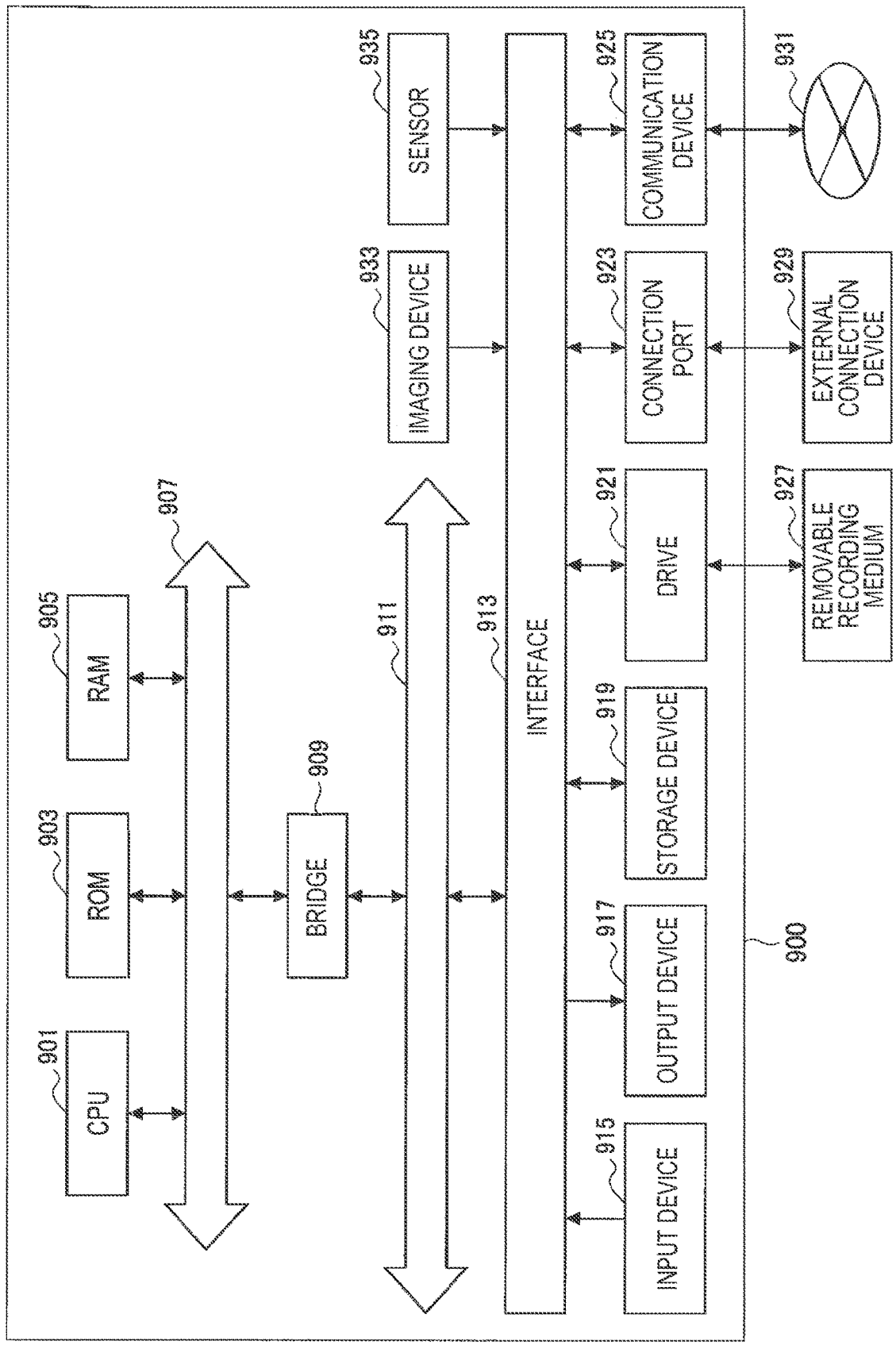
FIG. 16 is a block diagram showing an example of a hardware configuration of an electronic apparatus according to an embodiment of the present disclosure.

Next, a hardware configuration of an electronic apparatus according to an embodiment of the present disclosure will be described with reference to FIG. 16. FIG. 16 is a block diagram showing an example of the hardware configuration of the electronic apparatus according to the embodiment of the present disclosure. The illustrated electronic apparatus 900 can realize, for example, the HMD 100, the smartphone 200, and/or the server devices constituting the server 300 of the above-described embodiments.

The electronic apparatus 900 includes a CPU (Central Processing Unit) 901, a ROM (Read Only Memory) 903, and a RAM (Random Access Memory) 905. In addition, the electronic apparatus 900 may include a host bus 907, a bridge 909, an external bus 911, an interface 913, an input device 915, an output device 917, a storage device 919, a drive 921, a connection port 923, and a communication device 925. Further, the electronic apparatus 900 may include an imaging device 933 and a sensor 935 as necessary. The electronic apparatus 900 may include a processing circuit such as a DSP (Digital Signal Processor) or ASIC (Application Specific Integrated Circuit), alternatively or in addition to the CPU 901.

The CPU 901 serves as an operation processor and a controller, and controls all or some operations in the electronic apparatus 900 in accordance with various programs recorded in the ROM 903, the RAM 905, the storage device 919 or a removable recording medium 927. The ROM 903 stores programs and operation parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 is a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the electronic apparatus 900. Furthermore, the input device 915 includes an input control circuit which generates an input signal on the basis of the information which is input by a user and outputs the input signal to the CPU 901. By operating the input device 915, a user can input various types of data to the electronic apparatus 900 or issue instructions for causing the electronic apparatus 900 to perform a processing operation.

The output device 917 includes a device capable of visually or audibly notifying the user of acquired information. The output device 917 may include a display device such as an LCD (Liquid Crystal Display), a PDP (Plasma Display Panel), and an organic EL (Electro-Luminescence) displays, an audio output device such as a speaker or a headphone, and a peripheral device such as a printer. The output device 917 may output the results obtained from the process of the electronic apparatus 900 in a form of a video such as text or an image, and an audio such as voice or sound.

The storage device 919 is a device for data storage which is configured as an example of a storage unit of the electronic apparatus 900. The storage device 919 includes, for example, a magnetic storage device such as a HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the electronic apparatus 900 or attached externally thereto. The drive 921 reads information recorded in the removable recording medium 927 attached thereto, and outputs the read information to the RAM 905. Further, the drive 921 writes in the removable recording medium 927 attached thereto.

The connection port 923 is a port used to directly connect devices to the electronic apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (registered trademark) (High-Definition Multimedia Interface) port, and so on. The connection of the external connection device 929 to the connection port 923 makes it possible to exchange various data between the electronic apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the electronic apparatus 900, such as the orientation of the case of the electronic apparatus 900, as well as information regarding the environment surrounding the electronic apparatus 900, such as the brightness or noise surrounding the electronic apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the electronic apparatus 900. Each of the above components may be realized using general-purpose members, but may also be realized in hardware specialized in the function of each component. Such a configuration may also be modified as appropriate according to the technological level at the time of the implementation.

6. Supplement

The embodiments of the present disclosure may include the electronic apparatus, the system, the method executed in the electronic apparatus or the system, the program for causing the electronic apparatus to function, and the non-transitory tangible media having the program recorded thereon, which have been described above, for example.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The effects described in the specification are just explanatory or exemplary effects, and are not limiting. That is, the technology according to the present disclosure can exhibit other effects that are apparent to a person skilled in the art from the descriptions in the specification, along with the above effects or instead of the above effects.

Additionally, the present technology may also be configured as below.

(1)

An electronic apparatus including:

a wearable optical device;

a state detection unit configured to detect a state relating to the wearable optical device;

a state determination unit configured to determine that the detected state is at least one of a first state in which the wearable optical device is worn by a user in usable state or a second state in which the wearable optical device is worn or carried by the user in unusable state; and a power supply controller configured to control a power supply state of the electronic apparatus based on a result obtained by the determination.

(2)

The electronic apparatus according to (1), wherein the state detection unit detects a state of an attitude or movement of the wearable optical device.

(3)

The electronic apparatus according to (2), wherein the state detection unit includes an acceleration sensor.

(4)

The electronic apparatus according to (3), wherein the state determination unit executes the determination based on a detection value obtained by the acceleration sensor.

(5)

The electronic apparatus according to (4), wherein the state determination unit determines that the detected state is the second state when a direction of a gravitational acceleration component detected by the acceleration sensor is different from a predetermined direction.

(6)

The electronic apparatus according to (5), wherein the state determination unit determines that the detected state is the second state when a state in which the direction of the gravitational acceleration component is different from a predetermined direction continues for a predetermined time.

(7)

The electronic apparatus according to any one of (3) to (6), wherein the state determination unit executes the determination based on a variation in detection values obtained by the acceleration sensor.

(8)

The electronic apparatus according to (7), wherein the state determination unit determines that the detected state is the second state when a state in which the variation is less than a first threshold continues for a predetermined time.

(9)

The electronic apparatus according to any one of (1) to (8), wherein the wearable optical device includes an attachment member used for attachment to a head of the user, and wherein the state detection unit detects a state of the attachment member.

(10)

The electronic apparatus according to (9), wherein the attachment member includes a connection part, wherein the state detection unit detects a state of the connection part, and wherein the state determination unit executes the determination based on the state of the connection part.

(11)

The electronic apparatus according to (9), wherein the attachment member is elastically deformable, wherein the state detection unit detects a state in which the attachment member is elastically deformed, and wherein the state determination unit determines that the state in which the attachment member is elastically deformed is the second state.

(12)

The electronic apparatus according to any one of (1) to (11), wherein the state detection unit detects a state of the user.

(13)

The electronic apparatus according to (12), wherein the state detection unit includes a line-of-sight sensor configured to detect a line of sight of the user, and wherein the state determination unit determines that a state in which the line-of-sight sensor is not detecting the line of sight of the user is the second state.

(14)

The electronic apparatus according to any one of (1) to (13), wherein the state detection unit detects an environmental condition surrounding the wearable optical device.

(15)

The electronic apparatus according to (14), wherein the state detection unit detects illuminance surrounding the wearable optical device, and wherein the state determination unit determines that a state in which the illuminance is less than a threshold is the second state.

(16)

The electronic apparatus according to any one of (1) to (15), wherein the power supply controller causes the power supply state to undergo a transition to a power saving state when the detected state is determined to be the second state.

(17)

The electronic apparatus according to (16), wherein the power saving state includes a plurality of power saving states each having different power consumption, and wherein the power supply controller causes the power supply state to undergo a stepwise transition to the power saving state having lower power consumption depending on a duration of the second state.

(18)

The electronic apparatus according to (16) or (17), wherein the power supply controller causes the power supply state to return from the power saving state when the first state is determined.

(19)

The electronic apparatus according to (18), wherein the power saving state includes a first power saving state in which the state detection unit is capable of detecting a state corresponding to the first state or the second state and a second power saving state in which the state detection unit is incapable of detecting the first state or the second state, the second power saving state being lower in power consumption than the first power saving state, and wherein the power supply controller causes the power supply state to undergo a stepwise transition from the first power saving state to the second power saving state depending on a duration of the second state and causes the power supply state to return from the power saving state when a state detected in the first power saving state is determined to be the first state.

(20)

A method of controlling power supply including:

detecting a state relating to a wearable optical device;

determining that the detected state is at least one of a first state in which the wearable optical device is worn by a user in usable state or a second state in which the wearable optical device is worn or carried by the user in unusable state; and controlling a power supply state of an electronic apparatus including the wearable optical device based on a result obtained by the determination.

REFERENCE SIGNS LIST 10 system
100 HMD
110 display unit
112 light source
114 light guide plate
116 motion sensor
118 camera
120 switch
122 temple
124 hinge
126 belt
128 buckle
130 illuminance sensor
160 control unit
162 processor
164 memory
200 smartphone 202 processor
204 memory
300 server
302 processor
304 memory
510, 610, 710 state determination unit
520 power supply controller

The invention claimed is:

1. An information processing apparatus, comprising:
circuitry configured to:
   receive a detection result of a sensor associated with a head-mounted optical device; and
   determine a state of the head-mounted optical device based on the detection result, wherein the determined state is one of a first state in which the head-mounted optical device is worn by a user in a usable state or a second state in which the head-mounted optical device is worn by the user in an unusable state; and
a power supply controller configured to:
   control a power supply state of at least one of the information processing apparatus or the head-mounted optical device based on the determination; and
   control an operation of a touch sensor of the head-mounted optical device based on the controlled power supply state.

2. The information processing apparatus according to claim 1, wherein the sensor includes an acceleration sensor.

3. The information processing apparatus according to claim 2, wherein the circuitry is further configured to determine the state based on a detection value obtained by the acceleration sensor.

4. The information processing apparatus according to claim 3, wherein the circuitry is further configured to determine the state of the head-mounted optical device as the second state based on a direction of a gravitational acceleration component detected by the acceleration sensor.

5. The information processing apparatus according to claim 4, wherein the circuitry is further configured to determine the state of the head-mounted optical device as the second state based on a continuation of the direction of the gravitational acceleration component for a threshold time.

6. The information processing apparatus according to claim 1, wherein
the head-mounted optical device includes an attachment member usable for attachment to a head of the user, and
the sensor detects a state of the attachment member.

7. The information processing apparatus according to claim 6, wherein
the attachment member includes a connection part,
the sensor detects a state of the connection part, and
the circuitry is further configured to determine the state of the head-mounted optical device based on the detected state of the connection part.

8. The information processing apparatus according to claim 6, wherein
the attachment member is elastically deformable,
the circuitry is further configured to
   determine the state of the head-mounted optical device as the second state based on the detected state of the attachment member that is an elastically deformed state of the attachment member, and
the attachment member is elastically deformed in the elastically deformed state.

9. The information processing apparatus according to claim 1, wherein the sensor detects a state of the user.

10. The information processing apparatus according to claim 9, wherein
the sensor includes a line-of-sight sensor configured to detect a line of sight of the user, and
the circuitry is further configured to determine the state of the head-mounted optical device in which the line-of-sight sensor fails to detect the line of sight of the user as the second state.

11. The information processing apparatus according to claim 1, wherein the sensor detects an environmental condition surrounding the head-mounted optical device.

12. The information processing apparatus according to claim 11, wherein
the sensor further detects illuminance surrounding the head-mounted optical device, and
the circuitry is further configured to
determine the state of the head-mounted optical device as the second state based on the detected illuminance that is less than a threshold illuminance.

13. The information processing apparatus according to claim 1, wherein the power supply controller is further configured to change the power supply state from a normal power state to one of a plurality of power saving states based on the determined state that is the second state.

14. The information processing apparatus according to claim 13, wherein
each of the plurality of power saving states is associated with a different power consumption, and
the power supply controller is further configured to:
   change the power supply state from the normal power state to a first power saving state of the plurality of power saving states based on the determined state that is the second state; and
   change the power supply state from the first power saving state to a second power state of the plurality of power saving states based on a time duration of the second state.

15. The information processing apparatus according to claim 13, wherein the power supply controller is further configured to change the power supply state from the power saving state to the normal power state based on the determined state that is the first state.

16. The information processing apparatus according to claim 15, wherein
the plurality of power saving states includes a first power saving state and a second power saving state,
in the first power saving state, the circuitry is further configured to determine one of the first state or the second state,
in the second power saving state the circuitry is incapable of determining one of the first state or the second state,
the power supply controller is further configured to:
   supply a first power to at least one of the information processing apparatus or the head-mounted optical device in the first power saving state;
   supply a second power to at least one of the information processing apparatus or the head-mounted optical device in the second power saving mode, wherein the second power is less than the first power; and
   change the power supply state in a stepwise transition from the first power saving state to the second power saving state based on a duration of the second state, and
in the first power saving state, the power supply controller is further configured to change the power supply state from the first power saving state to the normal power state based on the determined state that is the first state.

17. The information processing apparatus according to claim 13, wherein in a first power saving state of the plurality of power saving states, the power supply controller is further configured to activate a display of the head-mounted optical device and the touch sensor of the head-mounted optical device, and in a second power saving state of the plurality of power saving states, the power supply controller is further configured to deactivate the touch sensor of the head-mounted optical device.

18. A method of controlling power supply, comprising:

receiving a detection result of a sensor associated with a head-mounted optical device;

determining a state of the head-mounted optical device based on the detection result, wherein the determined state is one of a first state in which the head-mounted optical device is worn by a user in a usable state or a second state in which the head-mounted optical device is worn by the user in an unusable state;

controlling a power supply state of at least one of an information processing apparatus or the head-mounted optical device based on the determination; and controlling an operation of a touch sensor of the head-mounted optical device based on the controlled power supply state.

19. A non-transitory computer-readable medium having stored thereon computer-executable instructions which, when executed by a computer, cause the computer to execute operations, the operations comprising:

receiving a detection result of a sensor associated with a head-mounted optical device;

determining a state of the head-mounted optical device based on the detection result, wherein the determined state is one of a first state in which the head-mounted optical device is worn by a user in a usable state or a second state in which the head-mounted optical device is worn by the user in an unusable state;

controlling a power supply state of at least one of an information processing apparatus or the head-mounted optical device based on the determination; and controlling an operation of a touch sensor of the head-mounted optical device based on the controlled power supply state.

* * * * *